United States Patent
Lee et al.

(10) Patent No.: US 10,412,741 B2
(45) Date of Patent: Sep. 10, 2019

(54) COMMUNICATION METHOD AND APPARATUS USING NETWORK SLICING

(71) Applicant: Electronics and Telecommunications Research Institute, Daejeon (KR)

(72) Inventors: Seung-Ik Lee, Daejeon (KR); Myung Ki Shin, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/198,197

(22) Filed: Nov. 21, 2018

(65) Prior Publication Data
US 2019/0098618 A1    Mar. 28, 2019

Related U.S. Application Data

(63) Continuation of application No. 15/488,809, filed on Apr. 17, 2017, now Pat. No. 10,142,994.

(30) Foreign Application Priority Data

Apr. 18, 2016  (KR) .................. 10-2016-0047216
Aug. 23, 2016  (KR) .................. 10-2016-0107022
Apr. 14, 2017  (KR) .................. 10-2017-0048448

(51) Int. Cl.
*H04W 24/00*       (2009.01)
*H04W 72/04*       (2009.01)
*H04W 28/16*       (2009.01)

(52) U.S. Cl.
CPC ......... *H04W 72/048* (2013.01); *H04W 28/16* (2013.01)

(58) Field of Classification Search
CPC ............................ H04W 72/048; H04W 28/16
USPC .............................. 455/456.1–456.3; 370/338
See application file for complete search history.

(56) References Cited

U.S. PATENT DOCUMENTS

2017/0142591 A1*   5/2017  Vrzic ................... H04W 24/08

* cited by examiner

*Primary Examiner* — Marcos Batista
(74) *Attorney, Agent, or Firm* — Kile Park Reed & Houtteman PLLC

(57) ABSTRACT

Provided is a communication method and apparatus using network slicing. A communication method of a communication apparatus performing communication with a user equipment receives a predetermined request from the user equipment, selects a single network slice instance to be allocated to the user equipment from among a plurality of network slice instances in the communication apparatus in response to the request, selects a single network function instance to be allocated to the user equipment from among a plurality of network function instances included in the selected network slice instance. The network slice instance is in an instantiated form of a network slice that includes at least one network function and resource for providing a network service having a predetermined capability and characteristic to the user equipment.

15 Claims, 15 Drawing Sheets

COMMUNICATION METHOD AND APPARATUS USING NETWORK SLICING

CROSS-REFERENCE TO RELATED APPLICATION(S)

This application is a continuation application of U.S. patent application Ser. No. 15/488,809, filed Apr. 17, 2017 (now pending), the disclosure of which is herein incorporated by reference in its entirety. The U.S. patent application Ser. No. 15/488,809 claims the priority benefit of Korean Patent Application No. 10-2016-0047216 filed on Apr. 18, 2016, Korean Patent Application No. 10-2016-0107022 filed on Aug. 23, 2016, and Korean Patent Application No. 10-2017-0048448 filed on Apr. 14, 2017 in the Korean Intellectual Property Office, the disclosures of which are incorporated herein by reference for all purposes.

BACKGROUND

1. Field

At least one example embodiment relates to a communication method and apparatus using network slicing, and more particularly, to a communication method and apparatus for selecting a network slice instance and a network function instance for providing a network service to a user equipment.

2. Description of Related Art 5G network technology may be $5^{th}$ generation mobile communication technology that is redesigned into an end-to-end (E2E) convergence network architecture to support various devices and various services as succeeding technology of $4^{th}$ generation long term evolution (LTE) mobile communication technology. The 5G network technology is expected to be an E2E system in which all of targets, for example, technology, domain, hierarch, equipment/device, user interaction, etc., of a network connected using a variety of methods including a wired manner are highly converged.

SUMMARY

At least one example embodiment may provide a communication method and apparatus using network slicing that may select a network slice instance and a network function instance corresponding to a network service requested from a user equipment, and may provide the requested network service to the user equipment through network slicing.

At least one example embodiment may also provide a communication method and apparatus using network slicing that may provide the flexibility of a 5G core network architecture according to the introduction of network virtualization technology, and enables a network provider to achieve the effectiveness maximization and cost reduction according to a network system and resource management.

According to an aspect of at least one example embodiment, there is provided a communication method of a communication apparatus performing communication with a user equipment, the method including receiving a predetermined request from the user equipment; selecting a single network slice instance to be allocated to the user equipment from among a plurality of network slice instances in the communication apparatus in response to the request; and selecting a single network function instance to be allocated to the user equipment from among a plurality of network function instances included in the selected network slice instance. The network slice instance is in an instantiated form of a network slice that includes at least one network function and resource for providing a network service having a predetermined capability and characteristic to the user equipment.

The selecting of the network slice instance may include selecting the network slice instance to be allocated to the user equipment based on network slice selection assistance information (NSSAI) included in the request.

The NSSAI may include a slice/service type (SST) requested from the user equipment or the slice/service type and a slice differentiator (SD) corresponding to the user equipment.

The slice/service type may indicate an expected network behavior in terms of a service requested from the user equipment.

The slice differentiator may complement the slice/service type to select a single network slice instance from among a plurality of network slice instances that comply with the slice/service type, in response to the plurality of network slice instances complying with the slice/service type.

The slice differentiator may include at least one of a registration area in which the user equipment is located, subscription of the user equipment, quality of service (QoS) attributes of the plurality of network slice instances requested, and a terminal characteristic.

The selecting of the network slice instance may include selecting the network slice instance to be allocated to the user equipment by further using at least one of a network slice instance pre-allocated to the user equipment and a serving registration area of the user equipment.

The selecting of the network function instance may include selecting the network function instance to be allocated to the user equipment based on a logical network identifier indicating the selected network slice instance and a type of a network function indicating a role of the corresponding network function instance.

The selecting of the network function instance may include selecting a single network function instance for each type of the network function among the plurality of network function instances included in the selected network slice instance.

The selecting of the network function instance may include selecting the network function instance to be allocated to the user equipment by further using a policy of a network operator that provides the network slice instance.

The selecting of the network function instance may include selecting the network function instance based on a selection condition received by a serving network function repository function (NRF) corresponding to the selected network slice instance from a source-network function instance (S-NFI) that requests the selection of the network function instance.

The selecting of the network function instance may include selecting, by a source-network function instance (S-NFI) receiving a selectable network function instance list from a serving network function repository function (NRF) corresponding to the selected network slice instance, the network function instance and forwarding information about the selected network function instance to the serving NRF.

According to another aspect of at least one example embodiment, there is provided a communication method of a communication apparatus performing communication with a user equipment, the method including receiving a predetermined request from the user equipment; selecting a single network slice instance to be allocated to the user equipment from among a plurality of network slice instances in the communication apparatus in response to the request; and forwarding a response to the request to the user equipment in response to the selection of the network slice instance. The network slice instance is in an instantiated form of a network slice that includes at least one network function and resource for providing a network service having a predetermined capability and characteristic to the user equipment.

The selecting of the network slice instance may include selecting the network slice instance to be allocated to the user equipment based on network slice selection assistance information (NSSAI) included in the request.

The communication method may further include performing relocation from a current access and mobility management function (AMF) to a new AMF in response to a detection of the new AMF further appropriate compared to the current AMF, to provide the selected network slice instance to the user equipment.

An AMF and a network slice selection function (NSSF) included in the communication apparatus may be shared by a plurality of network slice instances allocated to the user equipment in response to the plurality of network slice instances being allocated to the user equipment.

According to another aspect of at least one example embodiment, there is provided a communication apparatus including a processor; and a memory including at least one instruction executable at the processor. In response to an execution of the at least one instruction at the processor, the processor may be configured to receive a predetermined request from a user equipment, to select a single network slice instance to be allocated to the user equipment from among a plurality of network slice instances in the communication apparatus in response to the request, and to select a single network function instance to be allocated to the user equipment from among a plurality of network function instances included in the selected network slice instance, and the network slice instance may be in an instantiated form of a network slice that includes at least one network function and resource for providing a network service having a predetermined capability and characteristic to the user equipment.

The processor may be configured to select the network slice instance to be allocated to the user equipment based on network slice selection assistance information (NSSAI) included in the request.

The processor may be configured to select the network slice instance to be allocated to the user equipment by further using at least one of the network slice instance allocated to the user equipment and a serving registration area of the user equipment.

According to another aspect of at least one example embodiment, there is provided a communication apparatus including a processor; and a memory including at least one instruction executable at the processor. In response to an execution of the at least one instruction at the processor, the processor is configured to receive a predetermined request from a user equipment, to select a single network slice instance to be allocated to the user equipment from among a plurality of network slice instances in the communication apparatus in response to the request, and to forward a response to the request to the user equipment in response to the selection of the network slice instance, and the network slice instance is in an instantiated form of a network slice that includes at least one network function and resource for providing a network service having a predetermined capability and characteristic to the user equipment.

According to example embodiments, it is possible to provide a requested network service to a user equipment through network slicing by selecting a network slice instance and a network function instance corresponding to the network service requested from the user equipment.

Also, according to example embodiments, it is possible to provide the flexibility of a 5G core network architecture according to the introduction of network virtualization technology, and to enable a network provider to achieve the effectiveness maximization and cost reduction according to a network system and resource management.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
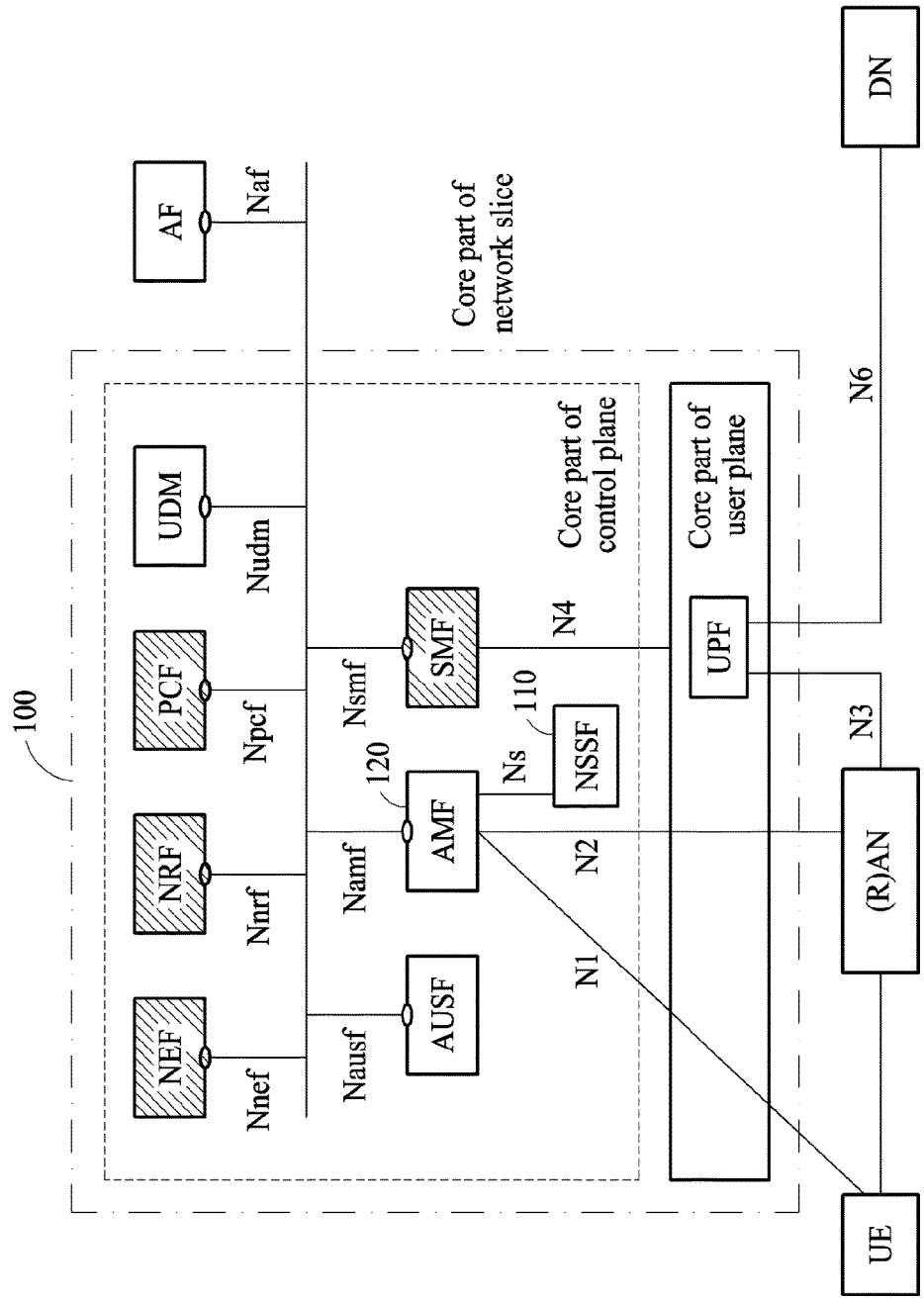
FIG. 1 illustrates a reference architecture for network slicing according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The following example embodiments may be used to perform communication. Hereinafter, an operation of performing communication may include an operation of selecting at least one network slice instance (NSI) from among a plurality of network slice instances (NSIs) in a communication apparatus, and an operation of selecting a single network function instance (NFI) from among a plurality of network function instances (NFIs) included in the selected network slice instance. The example embodiments may be configured as various types of computing devices and/or systems, for example, a smartphone, a smart electronic device, a personal computer, a laptop computer, a tablet computer, a wearable device, etc., which constitutes a user equipment (UE), a server, etc., which constitutes a network, and the like. The example embodiments will be described with reference to the accompanying drawings. Like reference numerals refer to like elements throughout.

FIG. 1 illustrates a reference architecture for network slicing according to an example embodiment.

FIG. 1 illustrates a core part 100 of a network slice in the reference architecture according to an example embodiment.

In the case of network slicing, a control plane of the core part 100 of the network slice may include two parts, for example, a common control part and a slice-specific part. Network functions within the common control part may be shared by multiple slice instances, whereas network functions within the slice-specific part may be dedicated to a specific target slice instance.

The reference architecture of FIG. 1 may be a network slicing non-roaming service-based architecture. Due to network slicing, a network slice selection function (NSSF) 110 corresponding to an additional network function may be added to the architecture that is specific to a network slicing deployment to support a network slice selection. More details on the functionality of the NSSF 110 will be described below.

A control plane network function that has a darker shadow may be a candidate to reside in the common control part or the slice-specific part. A control plane network function that does not have the darker shadow may be included in only the common control part. A method of including the control plane network function having the darker shadow in the common control part or the slice-specific part depending on a target network service supported by a network slice instance may follow a decision of an operator.

Here, a network function may be implemented either as a network element on dedicated hardware or as a software instance running on dedicated hardware, or may be implemented as a virtualized function instantiated on an appropriate platform, for example, on a cloud infrastructure.

An access and mobility management function (AMF) 120 may include the following functions. A portion of or all of the functions of the AMF 120 may be supported by a single instance of the AMF 120.

Termination of RAN CP interface (N2)
Termination of NAS (N1), NAS ciphering and integrity protection
Registration management
Connection management
Reachability management
Mobility management
Lawful intercept (for AMF 120 events and interface to LI system)
Transparent proxy for routing SM messages
Access authentication
Access authorization
Security anchor function (SEA). The SEA may interact with an authentication server function (AUSF) and a UE, and may receive an intermediate key that is set as a result of a UE authentication process. In the case of universal subscriber identify module (USIM)-based authentication, the AMF 120 may retrieve security materials from the AUSF.
Security context management (SCM). The SCM may receive, from the SEA, a key used to derive an access network specific key.

Here, regardless of the number of network functions, a single non-access stratum (NAS) interface instance is present per radio access network (RAN) between the UE and a control network (CN), and terminated at one of network functions that implement at least NAS security and mobility management.

Once network slicing is deployed, the AMF 120 may interact with the NSSF 110 over a network slice interface and a network slice instance may be selected. The network slice instance selection (NSI selection) will be further described below.

Here, network slicing technology may indicate technology capable of applying network isolation and customization attributes to a mobile communication core network architecture by grouping and thereby providing network resources and network functions into a single independent slice based on a service. The network slicing technology, as a new concept of a 5G core network not used in the existing mobile communication network technology, may be technology for grouping and thereby providing network resources and network functions required for a service requested from a mobile terminal into a single independent slice.

In this manner, each network provider may independently allocate a network resource specified for each service and user, and may secure the expandability and reliability of service and network resource operation by achieving the network flexibility through software defined networking/network function virtualization (SDN/NFV) technology-based resource virtualization.

Hereinafter, the network slicing technology will be described with reference to FIG. 2.

Figure 2:
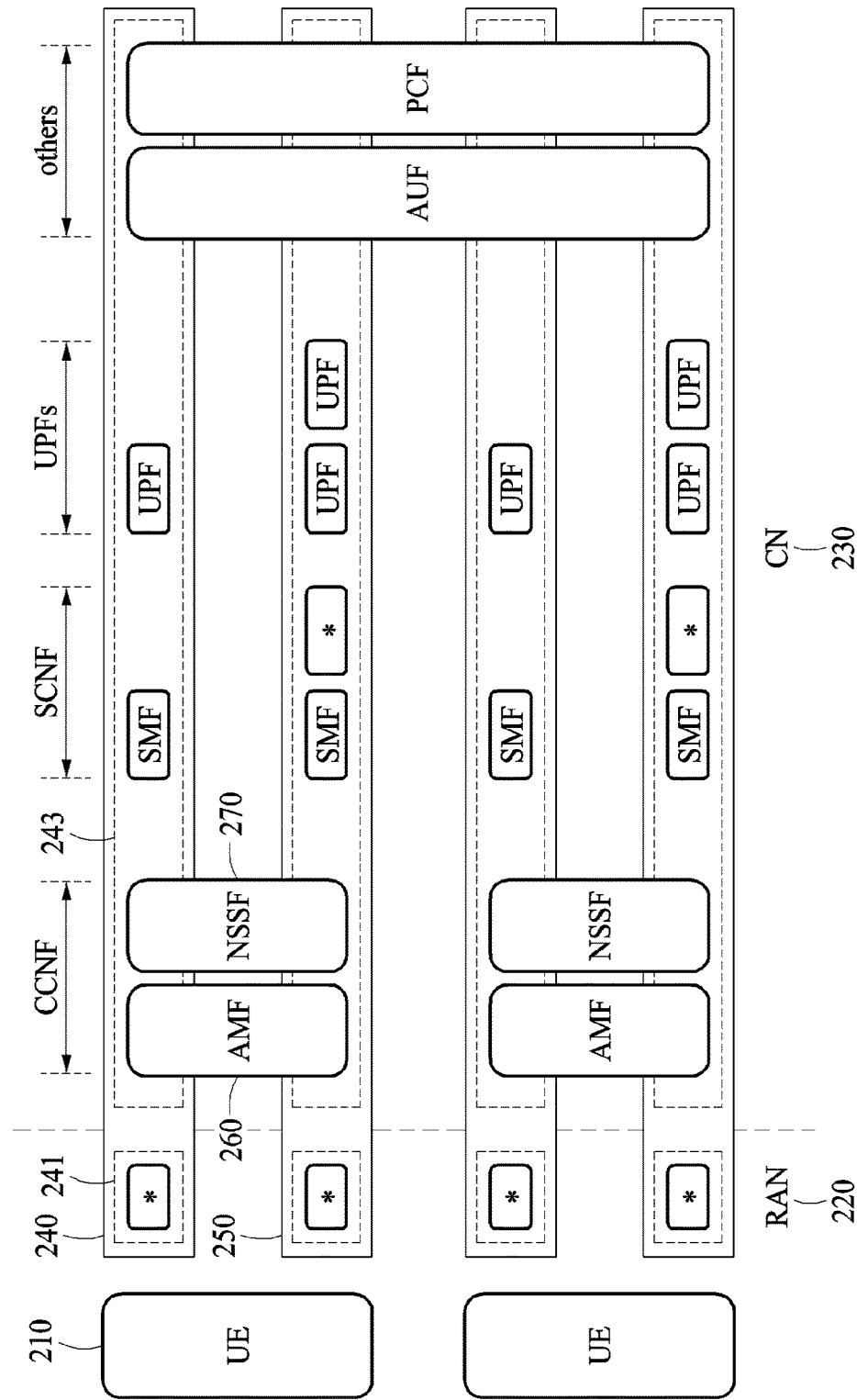
FIG. 2 illustrates an architecture of a network slice according to an example embodiment.

FIG. 2 illustrates an architecture of a network slice according to an example embodiment.

Referring to FIG. 2, network slice instances are allocated to a UE.

The network slice may be a complete logical network that includes a set of network functions and corresponding resources required to provide a specific network capability and network characteristic. The network slice may be present on a radio access network (RAN) 220 and a core network (CN) 230. A network slice instance may be the instantiation of the network slice, that is, a deployed set of network functions that deliver intended network slice services according to a network slice template.

An AN may be common for multiple network slices. For example, the AN may be a non-3GPP access network or a 5G RAN.

The network slice may be configured to be different for each supported feature and network function optimization. An operator may deploy the plurality of network service instances that deliver exactly the same optimization and features, however, dedicated to different groups based on UE characteristics.

For example, referring to FIG. 2, a plurality of network slice instances 240 and 250 may be allocated to the UE 210. The network slice instances 240 and 250 may be defined on the RAN 220 and the CN 230. For example, the network slice instance 240 may include a RAN part 241 and a CN part 243. The CN part 243 may include a common control network function (CCNF), a slice-specific control network function (SCNF), user plane functions (UPFs), and others.

Each network slice instance may include at least one network function instance for providing a network service required for a corresponding network slice instance. For example, the network slice instance 240 may be for a multimedia service and the network slice instance 250 may be for an Internet of Things (IoT) service.

The UE 210 may simultaneously access the plurality of network slice instances 240 and 250 through a single RAN 220. In this case, the network slice instances 240 and 250 may share a portion of control plane functions, for example, an AMF 260 and an NSSF 270. A control plane function shared by the plurality of network slice instances 240 and 250 allocated to the same UE 210 may be referred to as the CCNF.

For example, the UE 210 may use only a single AMF 260. That is, a single UE 210 may not be allowed to use two or more AMFs. Conversely, a single AMF 260 may be allocated to one or more UEs. FIG. 2 illustrates a case in which a single AMF 260 is allocated to a single UE 210 as an example.

The AMF 260 and the NSSF 270 included in the CCNF may be shared between the plurality of network slice instances 240 and 250 through NF sharing.

Also, an authentication function (AUF) and a policy control function (PCF) may be shared between one or more network slice instances based on an operator's policy through NF sharing.

Similar to the AMF 260, the NSSF 270 is a function included in the CCNF, and used to select a network slice instance corresponding to the UE 210.

The NSSF 270 may be a network function that has knowledge and overview of an NSI topology for a given public land mobile network (PLMN) (for example, recognizing the availability of a set of active network slice instance(s) corresponding to registration areas and for which entry point, that is, the AMF 260, that is accessible to a specific network slice instance). Also, the NSSF 270 may support a slice-level service mapping for given single-network slice selection assistance information (S-NSSAI) to select a target network slice instance based on a serving mobile virtual network operator (MVNO), a service or an over the top (OTT) provider, a UE location, a time window, and the like. Here, the target network slice instance may be selected from a pool of network slice instances for specific S-NSSAI for load balancing and redundancy.

The NSSF 270 may enforce operator configured slice-level control rules. For example, to provide mission-critical services, such as an autonomous driving or a remote industrial robot control, a network slice instance that guarantees low-latency access needs to be acquired.

The NSSF 270 may support a statistic collection for a slice selection for a management system of the serving PLMN.

The following parameters may be used to perform communication with the AMF 260 based on the aforementioned understanding about the NSSF 270.

An input parameter of the NSSF 270 may include accepted S-NSSAI. Additionally, depending on cases, at least one of a previous related NSI list of the UE 210 and a serving registration area of the UE 210 may be further considered as the input parameter of the NSSF 270.

An output parameter of the NSSF 270 may include information, for example, an NSI ID, about a selected new serving network slice instance corresponding to the accepted S-NSSAI. Additionally, depending on cases, at least one of a fully qualified domain name (FQDN) or an IP address of a selected new serving AMF and an FQDN or an IP address of a selected serving NF repository function (NRF) for a selected network slice instance may be further considered as the output parameter of the NSSF 270.

In the case of network sharing, each PLMN may include its own provisioned network slice instance and corresponding NRF to support NF discovery and selection within a network slice instance. Also, in addition to a type of a network function as the input parameter, a logical network identifier may be provided to the NRF for the NF discovery and selection so that the NRF may support a network function discovery and selection operation regardless of whether network slicing is present. In the case of network slicing, the logical network identifier indicates an NSI ID and otherwise, the logical network identifier indicates a serving PLMN.

Figure 3:
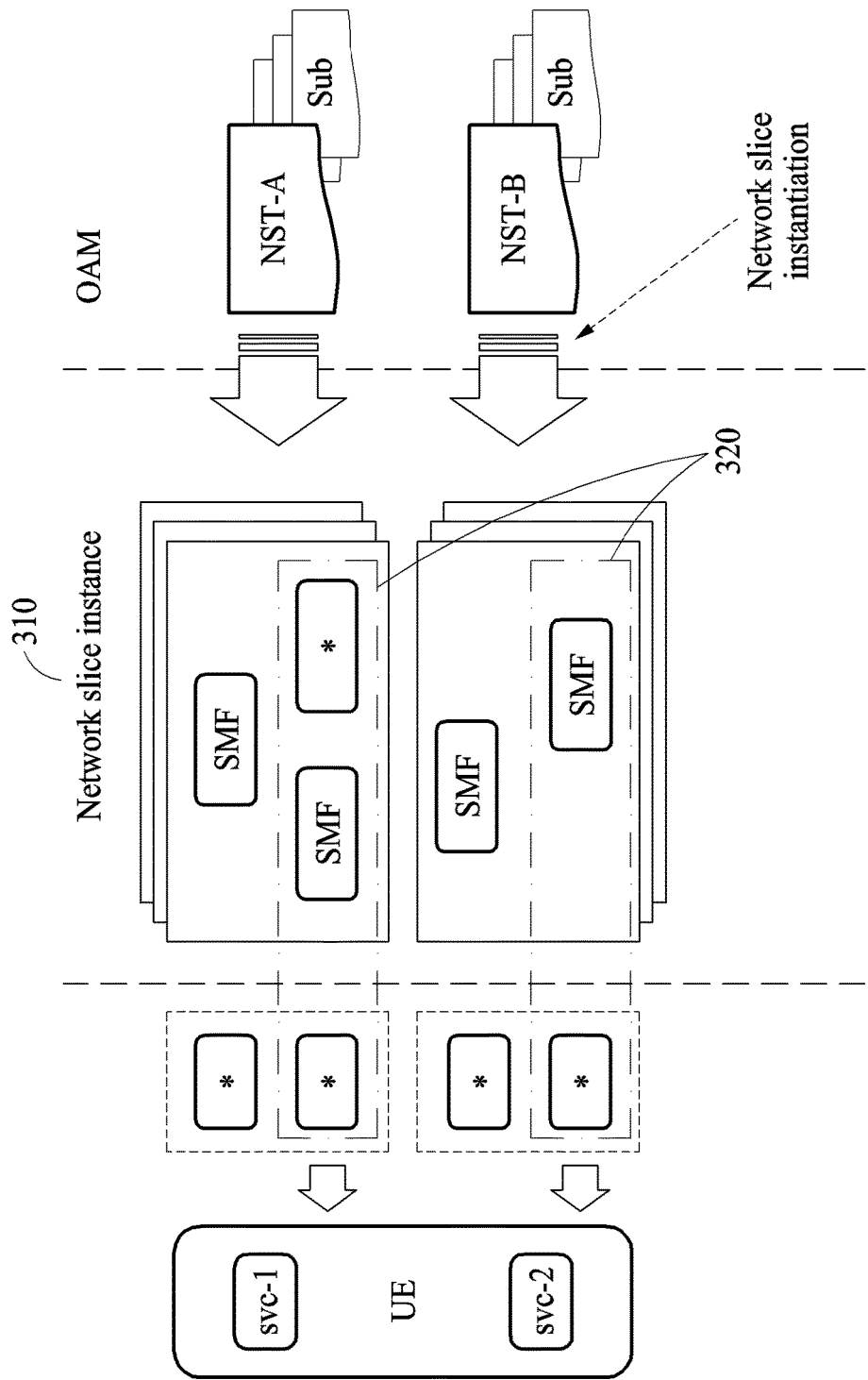
FIG. 3 illustrates an example of a network slice instance and a service instance according to an example embodiment.

FIG. 3 illustrates an example of a network slice instance and a service instance according to an example embodiment.

FIG. 3 illustrates a network slice instance 310 and a service instance 320 according to an example embodiment.

At least one network slice instance 310 may be defined in a network system. One of the at least one network slice instance 310 may be selected to provide a service requested from a UE. Details on an NSI selection will be described below.

The network slice instance 310 may be a set of network function instances ready to support a network service requested from the UE. At least one network function instance may provide the same network function, for example, a session management function (SMF), within the network slice instance 310. When a plurality of network function instances provides the same network function within the same network slice instance 310, a single network function instance may be selected from among the plurality of network function instances. Details on an NFI selection will be described below.

A single network slice instance 310 may be allocated to at least one UE and may also be allocated to at least one service. The network slice instance 310 may correspond to a resource group per service of an operator.

The service instance 320 may be a set of serving network function instances that support a service requested from the UE. The service instance 320 may include each network function required for a corresponding service. The service instance 320 may indicate a network slice instance substantially allocated to the UE.

Figure 4:
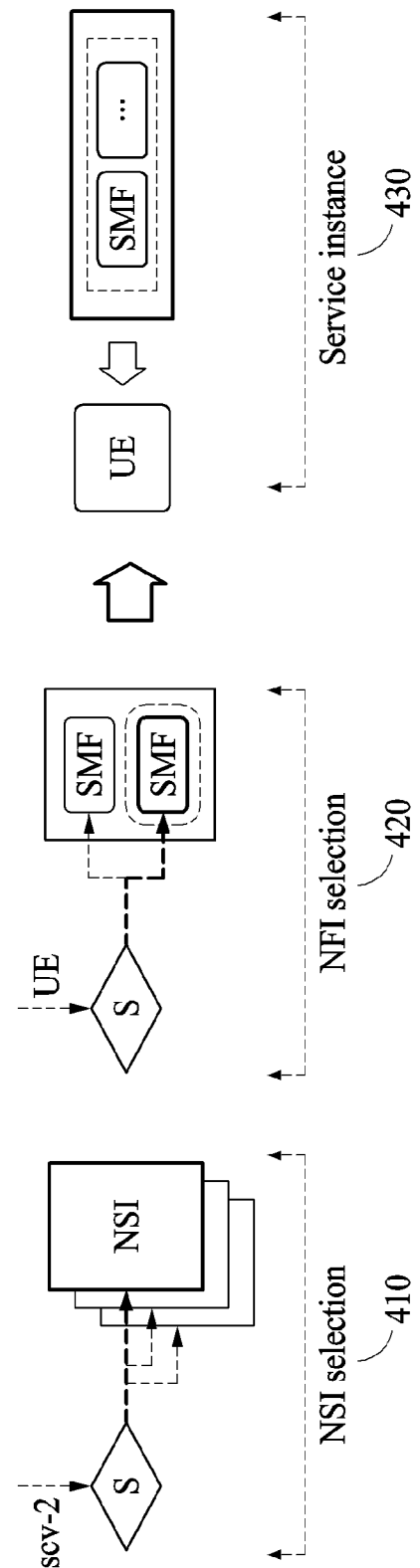
FIG. 4 illustrates an example of a service instance according to an example embodiment.

FIG. 4 illustrates an example of configuring a service instance according to an example embodiment.

A process of configuring a service instance 430 through an NSI selection 410 and an NFI selection 420 according to an example embodiment will be described with reference to FIG. 4.

In the NSI selection 410, a single network slice instance may be selected from among a plurality of network slice instances in a network system. Here, the network slice instance may be selected based on NSSAI. Additionally, the network slice instance may be selected by further using a network slice instance previously allocated to a UE and a serving registration area of the UE. An available NSI ID may be output as a selection result. Additionally, at least one of IP addresses of a new AMF and a serving NRF for the selected network slice instance may be further output. It will be further described.

In the NFI selection 420, a single network function instance may be selected from among a plurality of network function instances within the selected network slice instance. Here, the network function instance may be selected based on a logical network identifier and a type of a network function. The logical network identifier indicates an NSI ID in the case of network slicing, and otherwise, indicates a serving PLMN. The type of the network function indicates a role of a corresponding network function instance and may include, for example, an AMF, an NSSF, an SMF, a UPF, an AUF, a PCF, and the like. A single network function instance may be selected per type of a network function required to provide the network service requested from the UE.

For example, referring to FIG. 4, a plurality of SMFs may be present within a selected network slice instance. Even using the logical network identifier, that is, the selected NSI ID, and the type of the network function, that is, the SMF, one or more network function instances may be selected. If plurality of network function instances are selected, the operator's policy may be additionally considered in order to select a single network function instance. The operator's policy refers to a policy set by a network operator and may include, for example, load balancing, resource optimization, energy efficiency, traffic optimization, and the like.

For example, an SMF having the relatively small number of currently using UEs may be selected from two SMFs. Alternatively, an SMF having a relatively excellent QoS may be selected from the two SMFs. Alternatively, an SMF corresponding to a fee plan, for example, a basic fee plan and a premium fee plan, of a corresponding UE may be selected from the two SMFs. Alternatively, an SMF corresponding to a serving registration area of the corresponding UE may be selected from the two SMFs. Depending on cases, a network function instance may be selected by further using at least one of the aforementioned various criteria.

The service instance 430 may indicate a selected network slice instance that includes the selected network function instance. The service instance 430 may indicate a network slice instance capable of completely providing the network service requested from the UE.

Hereinafter, the NSI selection 410 and the NFI selection 420 will be further described. The NSI selection 410 may be performed during a UE registration procedure and a PDU session establishment procedure. The NFI selection 420 may be performed during the PDU session establishment procedure.

If a network system deploys network slicing, at least one network slice instance may be selected based on NSSAI provided from the UE. The NSSAI is a set of S-NSSAIs. Each piece of S-NSSAI may be used to select a specific network slice instance. In addition, UE capabilities and UE subscription data may be used to select a network slice instance.

S-NSSAI may include a slice/service type (SST) and a slice differentiator (SD). Here, the SST refers to an expected network behaviour in terms of features and services. The SD refers to optional information that complements the SST and may differentiate a plurality of network slice instances that satisfy the SST.

The UE subscription data may include information about a network slice instance that the UE is allowed to access. Information within the UE subscription data may include a plurality of pieces of S-NSSAI that the UE is allowed to use.

Also, the UE subscription data may include information regarding whether corresponding S-NSSAI is default S-NSSAI. Here, the default S-NSSAI may indicate a network slice instance that the UE is to use to attach to the network system. When the UE makes an initial registration to the network system without providing any NSSAI in a registration request, a CN needs to use default NSSAI including S-NSSAI values stored in the UE subscription data with a flag indicating that they are to be considered as default, in order to determine a default initial network slice instance to serve the UE. Also, the UE subscription data may include a data network name (DNN) value for S-NSSAI.

A CN part of a network slice instance that serves the UE may be selected by the CN, not by a RAN. The UE may simultaneously access a plurality of network slice instances through a single RAN. In this case, the network slice instances simultaneously accessed by the UE may share a portion of control plane functions that include an AMF in the CN.

An AMF selection for a set of network slice instances for the UE may be triggered by a first contacted AMF in a registration procedure, which may lead to change of the AMF. Once a target network slice instance is selected and a session management (SM) message for establishing a PDU session is received from the UE, a subsequent SMF network function discover and selection may be initiated by the AMF. An NRF may be used to perform the above selection tasks.

The PDU session may belong to a specific network slice instance. Although different network slice instances may not share the PDU session, the different network slice instances may include slice-specific PDU sessions to the same DNN.

The S-NSSAI may include standard values or PLMN-specific values. The plurality of pieces of S-NSSAI with PLMN-specific values may be associated with a PLMN ID of a PLMN that assigns the S-NSSAI in the UE. A single piece of S-NSSAI may not be used by the UE in access stratum procedures in any PLMN other than the one with which the S-NSSAI is associated.

The NSSAI may be used to select an AMF and a set of network slice instances, whereas the S-NSSAI may be used to select a specific network slice instance. Each piece of S-NSSAI included in the NSSAI may include (a) an SST or (b) the SST and an SD.

The UE may store configured and/or accepted NSSAI per PLMN. The configured NSSAI may be NSSAI configured in the UE by a home PLMN (HPLMN) to be used at the PLMN when no PLMN-specific accepted NSSAI is stored.

The accepted NSSAI refers to NSSAI provided from the PLMN to the UE, and the UE needs to use the accepted NSSAI after the PLMN successfully registers the UE. A registration accept message may include the accepted NSSAI. The accepted NSSAI may be updated through a subsequent registration procedure.

If configured or accepted NSSAI of a PLMN that the UE accesses is provided to the UE, the UE may provide the NSSAI in radio resource control (RRC) connection establishment and non-access stratum (NAS). The RAN may route an initial access to the AMF using the provided NSSAI.

If the UE does not receive any accepted NSSAI of the PLMN that the UE accesses and is provided with configured NSSAI, the UE may provide the configured NSSAI in the RRC connection establishment and NAS to the RAN. The RAN may use the NSSAI to route the initial access to the AMF. Alternatively, if the UE is not provided with any accepted NSSAI or configured NSSAI of the PLMN that the UE accesses, the UE may not provide the NSSAI in the RRC connection establishment and NAS and the RAN may send NAS signalling to a default AMF.

A network operator may provide a network slice selection policy (NSSP) to the UE. The NSSP may include one or more NSSP rules each that associates an application with specific S-NS SAI. The NSSP may include a default rule that matches all applications and includes default S-NS SAI. The UE may use the NSSP to associate a UE application with S-NSSAI When a UE application associated with specific S-NSSAI requests data transmission, and in this instance, if the UE includes one or more PDU sessions established with the specific S-NSSAI and if the other conditions of the UE do not prohibit the use of PDU sessions, the UE may route user data of the application in one of the PDU sessions. If the application provides a DNN, the UE may determine a PDU session to use based on the DNN.

When the UE application associated with the specific S-NSSAI requests the data transmission, and in this instance, if the UE does not include a PDU session established with the specific S-NSSAI, the UE may request a new PDU session with the S-NSSAI and the DNN that may be provided by the application.

Figure 5:
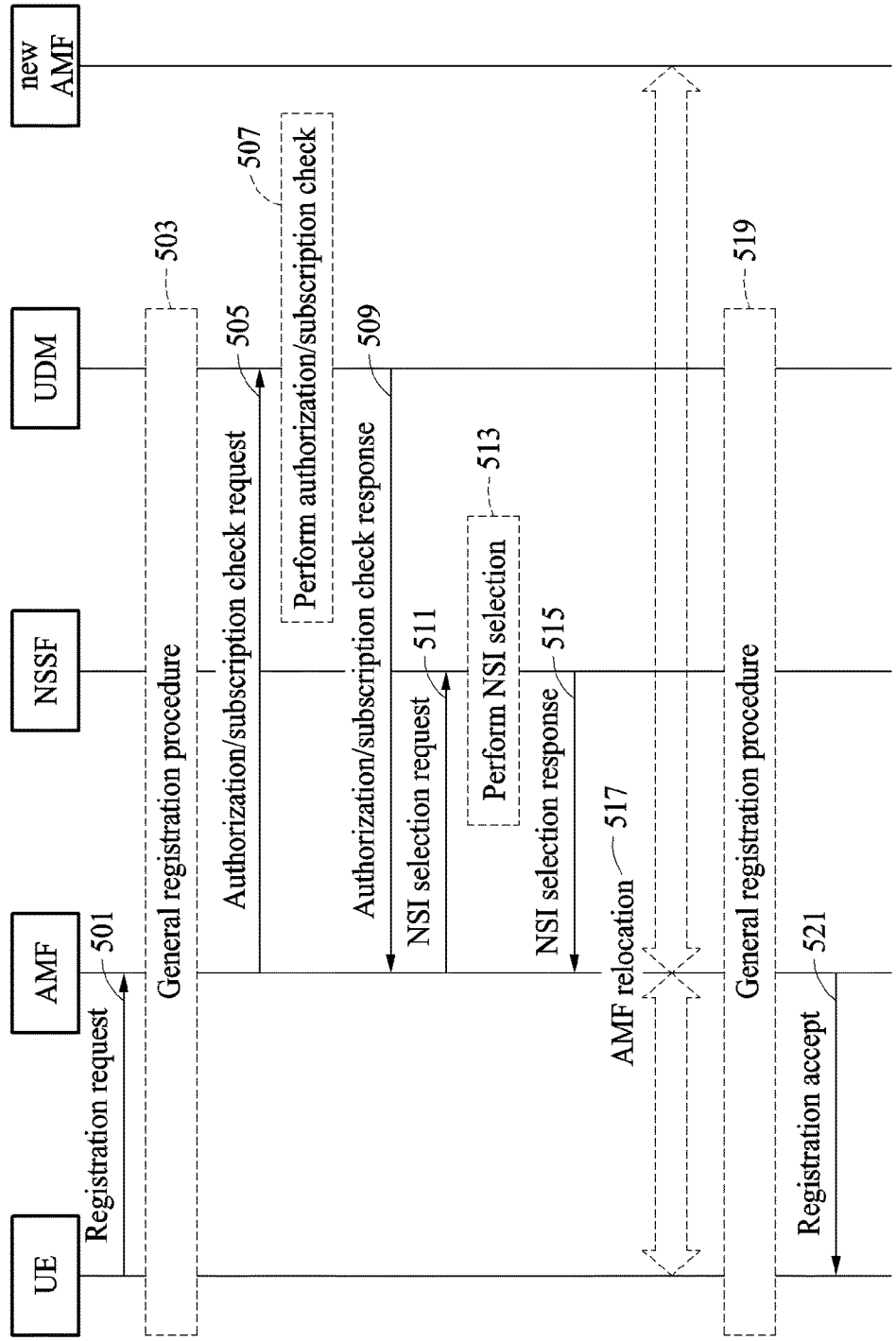
FIG. 5 illustrates an example of selecting a network slice instance in a user equipment registration procedure according to an example embodiment.

FIG. 5 illustrates an example of selecting an NSI in a UE registration procedure according to an example embodiment.

A communication method performed by a UE and a communication apparatus will be described with reference to FIG. 5. In FIG. 5, the UE refers to the user equipment and an AMF, a NSSF, a UDM, and a new AMF may indicate network function instances included in the communication apparatus.

Referring to FIG. 5, in operation 501, the UE sends a registration request to the AMF. The UE may send the registration request to the AMF with one of default NSSAI, configured NSSAI, and accepted NSSAI through a RAN. Here, the AMF may be an initial AMF.

In operation 503, a general registration procedure may be performed.

In operation 505, the AMF may send an authorization/subscription check request to the UDM with the NSSAI.

In operation 507, the UDM may check whether the UE is allowed to use a requested network slice instance (NSI) based on the NSSAI.

In operation 509, the UDM may send an authorization/subscription check response to the AMF with the accepted NSSAI. That is, the AMF may acquire the accepted NSSAI from the UDM and accordingly, may determine potential accepted S-NSSAI.

In operation 511, the AMF may send an NSI selection request to the NSSF with the accepted NSSAI.

In operation 513, the NSSF may determine the availability of the requested NSI based on the accepted NSSAI. If the NSSF detects a more appropriate AMF capable of providing the selected NSI than a current AMF, that is, the AMF that sends the NSI selection request to the NSSF, the NSSF may provide information about the new AMF to the current AMF.

In operation 515, the NSSF may forward information about the selected NSI to the AMF as an NSI selection response. Also, the NSSF may also forward information about the new AMF to the AMF as the NSI selection response.

If the current AMF determines to relocate a serving AMF for the UE, the AMF may trigger an AMF relocation procedure based information about the new AMF provided from the NSSF.

In operation 519, the general registration procedure may be performed.

In operation 521, the AMF may send a registration accept message to the UE with the accepted NSSAI.

That is, in the UE registration procedure, the AMF may acquire the accepted NSSAI from the UDM and may determine a set of potential accepted S-NSSAI. The availability of a network slice instance according to the serving registration area of the UE may be determined by verifying the set of potential accepted S-NSSAI through the NSSF.

The accepted NSSAI may be a result of validating the registration request from the UE in terms of the authorization/subscription check that is performed through consultation with the UDM that provides a list of authorized NSSAI, and the availability of the network slice instance that is performed through consultation with the NSSF that is provided by OA&M. Also, the accepted NSSAI may be altered based on a result of the NSI availability check at the NSSF as well as the subscription check.

After an initial slice selection or upon a successful attachment registration, the UE may be provided with a temporary ID that is used by the UE in an RRC connection establishment of a subsequent initial access so that the RAN may route a NAS message to an appropriate AMF as long as the temporary ID is valid. Also, the serving PLMN may return accepted NSSAI that includes a PLMN ID of the serving PLMN. The accepted NSSAI may include S-NSSAI values of network slice instances that are accepted by the PLMN for the UE to use. Here, it is assumed that a RAN and core slicing-related configuration does not change within a registration area of the UE.

For enabling routing of NAS signalling to correct CN functions, the UE may include NSSAI stored for the PLMN and a complete temporary ID in an RRC. If the RAN is aware of and capable of reaching the AMF associated with the temporary ID, the RAN may forward the request to this AMF. Otherwise, the RAN may select an appropriate AMF based on the NSSAI provided from the UE, and may forward the request to the selected AMF. If the RAN is incapable of selecting the AMF based on the accepted NSSAI, the request may be sent to a default AMF.

The UE may need to include, in a PDU session establishment request NAS message, S-NSSAI that enables selection of an SMF with a DNN of a data network for a PDU session.

The RAN needs to be aware of a network slice used by the UE so that the RAN may select an appropriate resource for supporting network slicing in the RAN.

The UE may cause a network to change a set of slice instances the UE is using by submitting a new value of NSSAI in a registration request procedure. A final decision of a set of network slices allocated to the UE may be made by the network system.

The network system may change a set of network slice instances that are being used by the UE by providing the UE with a notification of accepted NSSAI change based on local policies, subscription changes, and/or UE mobility. This may trigger a UE-initiated registration procedure that includes, in RRC and NAS signalling, a value of new accepted NSSAI provided from the network system.

Changing a set of network slice instances initiated by the UE or the network may lead to changing an AMF based on an operator's policy. Changing a set of network slice instances accessible by the UE may cause termination of an ongoing PDU session with an original set of network slices if the network slice instances are not longer used. Here, some slices may be still retained potentially, that is, available.

During the initial registration procedure, when the network system determines that the UE needs to be served by another AMF, the AMF having received the initial registration request needs to redirect the initial registration request to a target AMF through the RAN or through direct signalling between the initial AMF and the target AMF. A redirection message sent from the AMF through the RAN may include information about the target AMF to serve the UE.

With respect to a UE that is already registered, the network system needs to support redirection of a UE from a serving AMF to a target AMF. The operator policy may be used to determine whether redirection between AMFs is allowed.

When the network system determines to redirect the UE due to the NSSAI change, the network system may send, to the UE, (a) updated/new NSSAI using a registration update required procedure and (b) an indication for the UE to initiate a registration update procedure with the updated/new NSSAI.

The AMF may select an SMF in a network slice instance based on S-NSSAI, a DNN, and other information, for example, UE subscription and local operator policies. The selected SMF may set a PDU session based on S-NSSAI and the DNN.

Figure 6:
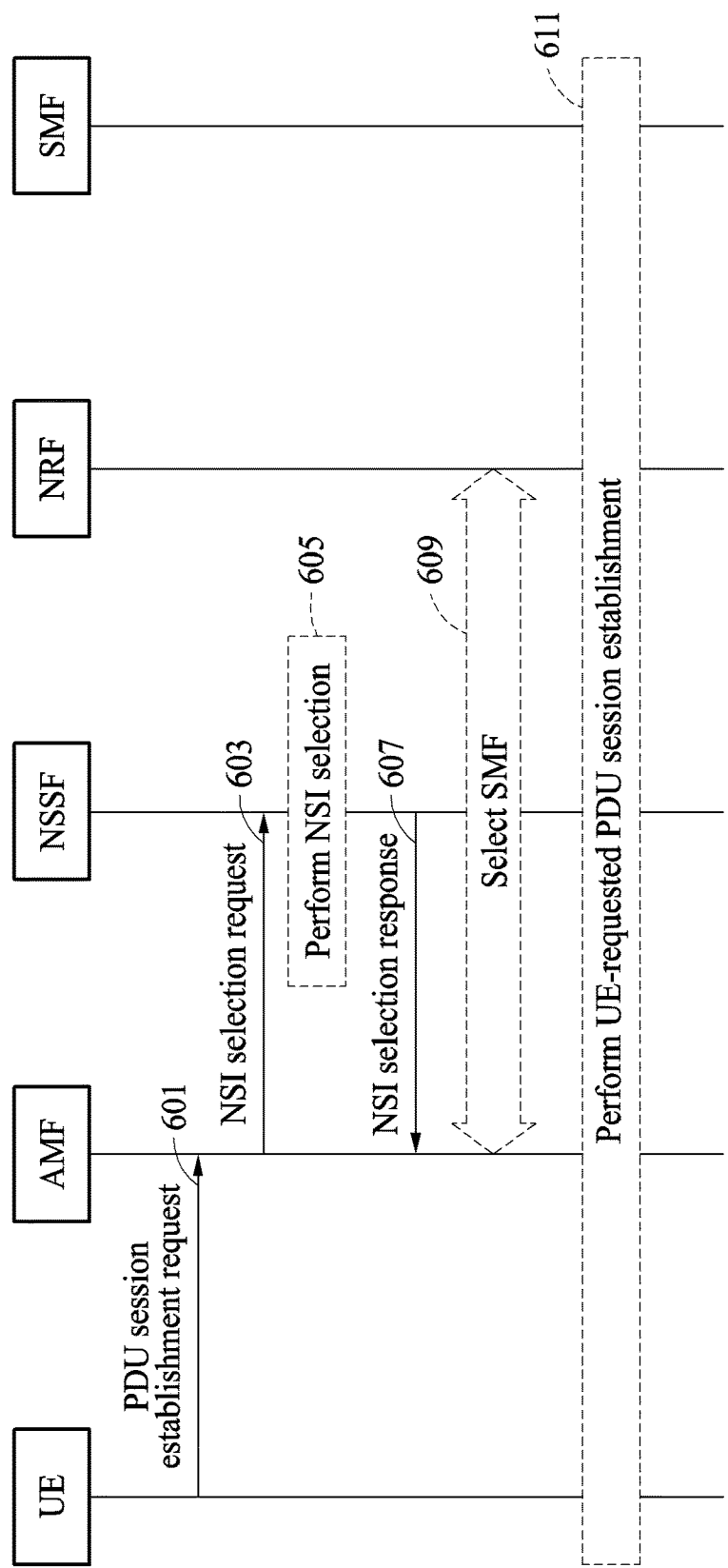
FIG. 6 illustrates an example of selecting a network slice instance and a network function instance in a protocol data unit (PDU) session establishment procedure according to an example embodiment.

FIG. 6 illustrates an example of selecting a network slice instance and a network function instance in a PDU session establishment procedure according to an example embodiment.

A communication method performed by a user equipment and a communication apparatus according to an example embodiment will be described with reference to FIG. 6. In FIG. 6, the UE refers to the user equipment and an AMF, an NSSF, an NRF, and an SMF may indicate network function instances included in the communication apparatus.

In operation 601, the UE may send a PDU session establishment request to the AMF with S-NSSAI through a RAN.

In operation 603, the AMF may send an NSI selection request to the NSSF with accepted S-NSSAI and an active network slice instance (NSI) accessed by the UE.

In operation 605, the NSSF may select a network slice instance corresponding to a serving registration area of the UE.

In operation 607, the NSSF may respond to the AMF for a selected serving network serving instance (NSI) and a serving NRF corresponding to the selected NSI.

In operation 609, the AMF may select an SMF through interaction with the serving NRF corresponding to the selected NSI.

In operation 611, a UE-request PDU session establishment may be performed.

That is, when performing the PDU session establishment, the AMF may verify a set of potential accepted S-NSSAI through the NSSF to determine the availability of a network service instance according to the serving registration area of the UE. Also, the AMF may provide active NSI information accessed by the UE to the NSSF. The NSSF may provide information about the selected NSI and the serving NRF corresponding to the selected NSI to the AMF as a response.

Figure 7:
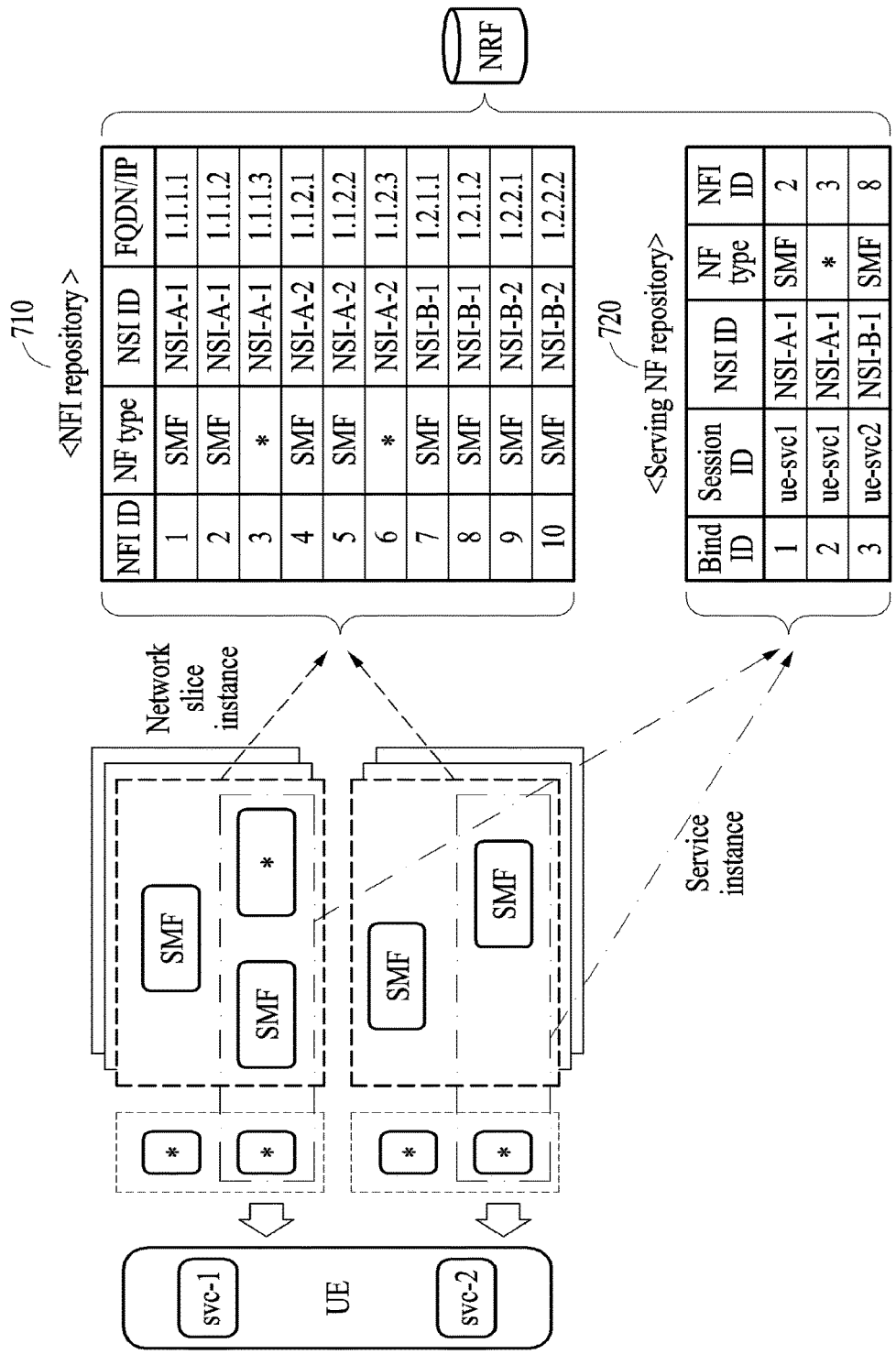
FIG. 7 illustrates an example of a repository according to an example embodiment.

FIG. 7 illustrates an example of a repository according to an example embodiment.

FIG. 7 illustrates an NFI repository 710 and a serving NF repository 720.

An NRF may manage the NFI repository 710 and the serving NF repository 720. The NFI repository 710 may include information about network function instances in a network system. For example, the NFI repository 710 may include an NFI ID, an NF type, an NSI ID, and an FQDN/IP. The NFI ID denotes an instance of a corresponding network function instance, and the NSI ID denotes an ID of a network slice instance that includes the corresponding network function instance.

The NFI repository 710 may be updated by an Operations, Administration and Management (OAM). In detail, NSI orchestration included in the OAM may perform a network slice (NS) instantiation and a network slice instance (NSI) update and termination. Also, NFI orchestration included in the OAM may perform a network function (NF) instantiation, an NFI update and termination, and an NFI scaling and migration.

An NFI selection may be performed based on information included in the NFI repository 710. In response to an occurrence of the NFI selection, the NRF may store information about the selected NFI in the serving NF repository 720. That is, the serving NF repository 720 may include information about the serving NFI selected for the UE. An NFI included in the serving NF repository 720 may constitute a service instance.

The NRF may support a service discovery function. In response to an NF discovery request received from a network function instance, the NRF may provide information about the discovered network function instance to the network function instance that requests NF discovery.

In addition to a network function type, a logical network identifier may be provided to the NRF so that the NRF may support a network function selection and discovery operation regardless of whether network slicing is present. In the case of network slicing, the logical network identifier indicates an NSI ID and otherwise, the logical network identifier indicates a serving PLMN.

Figure 8:
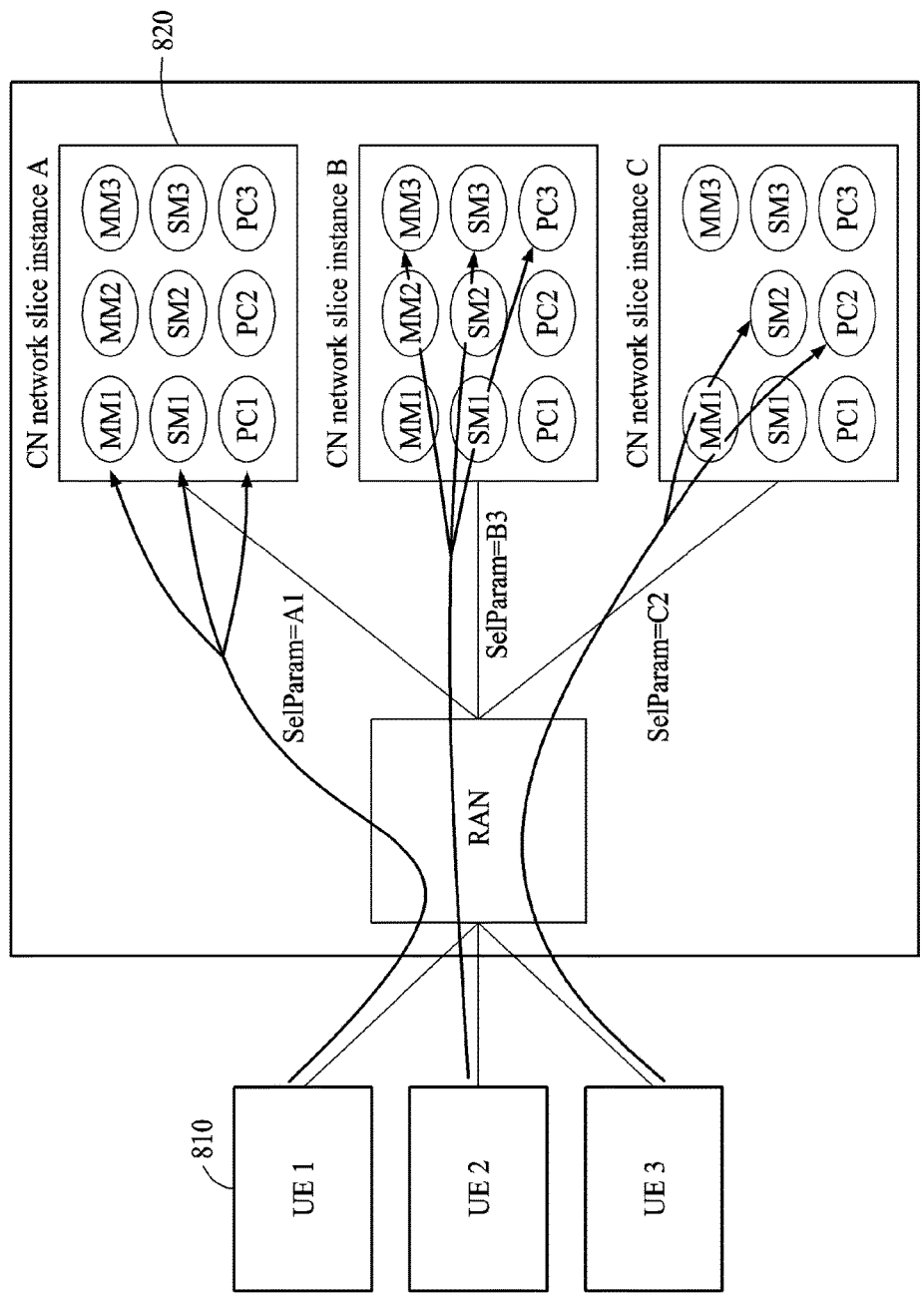
FIGS. 8 through 10 illustrate examples of selecting a network slice instance and a network function instance in a network slicing architecture according to an example embodiment.
Figure 9:
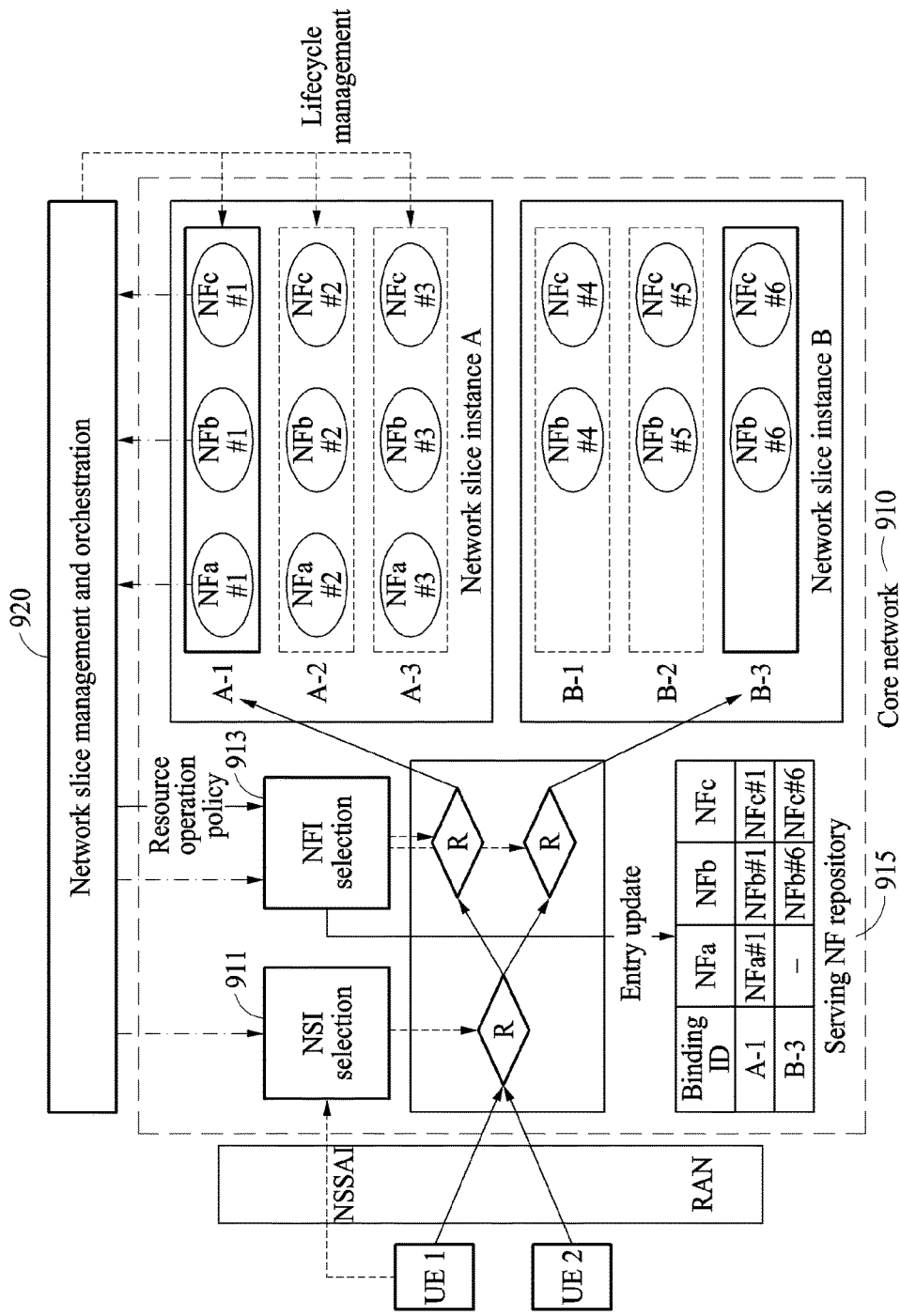
Figure 10:
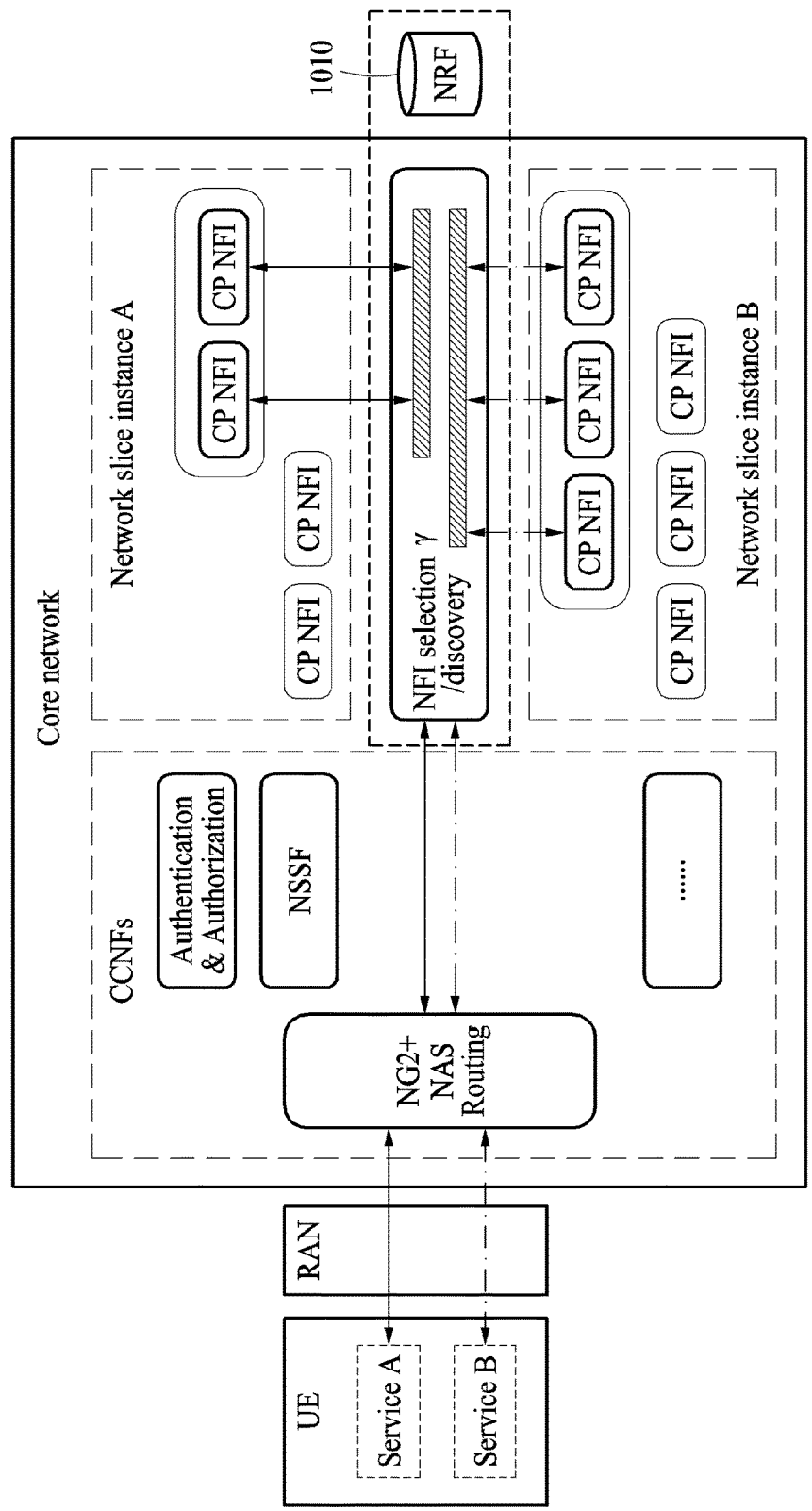

FIGS. 8 through 10 illustrate examples of an NSI selection and an NFI selection in a network slicing architecture according to an example embodiment.

The NSI selection and the NFI selection will be described with reference to FIG. 8.

UE1 810 may access a CN network slice instance A 820 and network function instances, for example, MM1, SM1, and PC1 selected by a CN through a RAN. An NSI selection procedure for a UE may be performed based on NSSAI configured for the UE. The UE may report the NSSAI to a network. A network slice instance may be selected based on the NSSAI provided from the UE and other information, for example, subscription data, available in the network.

The network slice instance for the UE may be selected based on a required application and a type of service. A selection of the network slice instance may consider elements, such as UE functionality, configuration, and authorization.

Through the NSI selection and the NFI selection, an appropriate network function instance capable of providing a specific service within a selected network slice may be selected based on a predetermined selection condition.

The selection condition may indicate NSSAI. The NSSAI may include an SST and an SD. The examples of SST include an enhanced mobile broadband (eMBB) service, a critical communications (CriC) service, and a massive machine type communication mMTC service, The network system may use the NSSAI with other information, for example, subscription data, available in the network to select an appropriate network slice instance and network function instance. Hereinafter, mechanisms for the NSI selection and the NFI selection will be described.

Two-Step Selection Mechanism

As a first step, an NSI selection function may select an appropriate network slice instance within a CN based on NSSAI with information, for example, subscription data, available in the network. As a second step, an NFI selection function may select an appropriate network function instance within the network slice instance selected in the first step based on resource operation policies and the like.

One-Step Selection Mechanism

The NSI selection function may select a network slice instance and a network function instance per each network function type for a UE based on an SST and an SD with information, for example, subscription data, available in the network, and may direct the selected network slice instance and network function instance to the UE.

Also, the NFI selection function may collect QoS attributes, for example, a delay and a throughput, of a network function instance, and may also select a network function instance for the UE from the network slice instance using the QoS attributes.

FIG. 9 illustrates a function of selecting a network slice instance and a network function instance in a CN according to an example embodiment.

Referring to FIG. 9, a UE1 may forward NSSAI to a core network (CN) 910 through a RAN, and a NSI selection 911 may be performed based on the NSSAI, and an NFI selection 913 may be performed. Here, the NSI selection 911 may be performed by an NSSF and the NFI selection 913 may be performed by an NRF. In detail, the NRF may perform NFI selection and NFI discovery.

Here, a network slice management and orchestration 920 may monitor network function instances, for example, NFa#1, NFb#1, and NFc#1, included in a network slice instance. NSSF may perform the NSI selection 911 based on a monitoring result and NRF may perform the NFI selection 913 based on the monitoring result. For example, the monitoring operation may be performed to obtain QoS attributes of each of the network function instances and may be represented as indicated with alternated long and short dash lines of FIG. 9.

Once the NFI selection 913 is performed, entry update may be performed. A result of the NSI selection 911 and the NFI selection 913 may be stored in a serving NF repository 915.

A network function instance may be selected from the network slice instance based on redundancy, expandability, capability, and the like. Accordingly, there is a need to determine a set of corresponding network function instances per UE service request based on a policy of a network operator. In addition, the NFI selection 913 may be performed by further considering load balancing, resource optimization, energy efficiency, and the like. That is, redundancy, expandability, capability, load balancing, resource optimization, energy efficiency, and the like may be considered as a policy of a network operator.

The network slice management and orchestration 920 may provide a resource operation policy of the network operator, may provide QoS attributes of the network function instance, and may manage a lifecycle of the network function instance.

FIG. 10 illustrates an NRF 1010 to perform an NFI selection/discovery function according to an example embodiment.

Referring to FIG. 10, the NRF 1010 may manage a selection result of a network function instance, and may perform discovery for the selected network function instance in response to a request from the network function instance.

A plurality of instances for a network function may be provided within the network slice instance for redundancy, expandability, and the like. That is, a plurality of instances for the same network function may have different QoS attributes, for example, capability, performance, and the like. An appropriate network function instance may be selected from the network slice instance based on QoS attributes of network function instances. Alternatively, a network function instance may be reselected to meet a specific QoS attribute.

This NFI selection may be based on the following rules.

A network slice instance may include a plurality of network function instances for a specific service with network capabilities. A network slice instance per requested UE service may be selected based on "network slice selection assistance information" (NSSAI). Two or more network function instances per each network function type may be provided for capability, duplication, expandability, and the like, within the network slice instance. A set of network function instances may be selected per UE service request for binding. An NFI selection may be performed according to a policy of the network operator, for example, energy efficiency, load balancing, resource optimization, and the like. Binding information of the selected network function instance may be additionally provided to the NRF 1010. For roaming, a set of network function instances may be updated by reselecting the network function instance or by changing QoS attributes of the network function instance, the policy of the network operator, roaming, and the like.

An NSSF may select an appropriate network slice instance based on the NSSAI. In detail, the NSSF may determine a target network slice instance classified into a service type requested from the UE and may select a network slice instance based on a variety of UE and network-provided NSSAI. For example, the NSSAI may include UE subscription data, the policy of the network operator, and the like.

The NRF 1010 may select an appropriate network function instance based on resource operational policies of the network operator, for example, load balancing, resource optimization, and the like. In detail, the NRF 1010 may identify a network function (NF) or an NF type of a given network slice instance, may determine a single instance from among a plurality of instances of each NF or NF type within the given network slice instance, and may store binding information of the selected network function instances in a serving NF repository of the NRF 1010.

Figure 11:
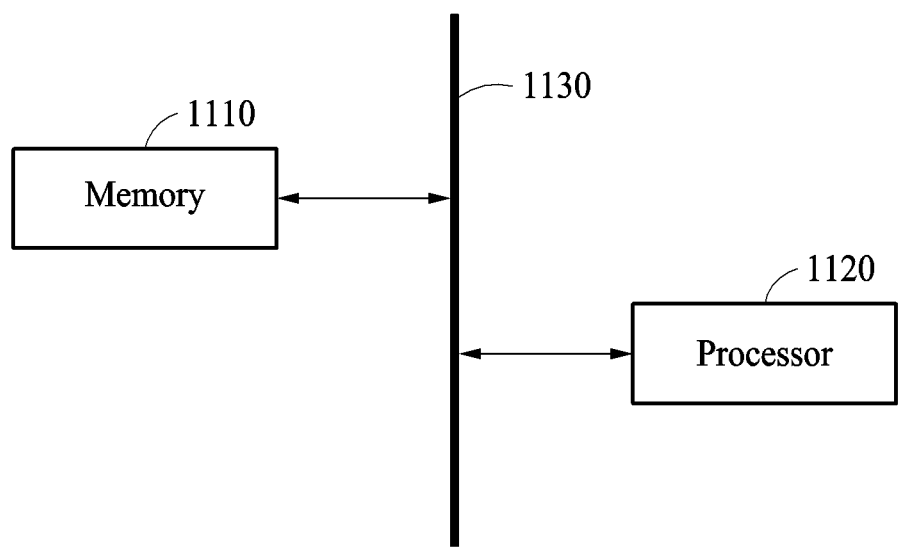
FIG. 11 is a diagram illustrating a communication apparatus according to an example embodiment.

FIG. 11 illustrates a communication apparatus according to an example embodiment.

Referring to FIG. 11, a communication apparatus 1100 includes a memory 1110 and a processor 1120. The memory 1110 and the processor 1120 may communicate with each other through a bus 1130.

The memory 1110 may include computer-readable instructions. In response to execution of the instructions stored in the memory 1110 at the processor 1120, the processor 1120 may perform the aforementioned operations. The memory 1110 may be a volatile memory or a non-volatile memory.

The processor 1120 may execute instructions or programs, or may control the communication apparatus 1100. The communication apparatus 1100 may be configured as a portion of various computing apparatuses. In addition, the processor 1120 may process the aforementioned operations in relation to the communication apparatus 1100.

In the case of a UE registration, the processor 1120 may receive a registration request from a UE, may select a network slice instance to be allocated to the UE from among a plurality of network slice instances in the communication apparatus 1100 in response to the registration request, and may forward a registration accept message corresponding to the selection of the network slice instance to the UE. Here, the network slice instance may be in an instantiated form of a network slice that includes at least one network function and resource for providing a network service having a predetermined capability and characteristic to the UE.

Also, in the case of a PDU session establishment, the processor 1120 may receive a PDU session establishment request from the UE, may select a network slice instance to be allocated to the UE from among the plurality of network slice instances in the communication apparatus 1100 in response to the PDU session establishment request, and may select a network function instance to be allocated to the UE from among a plurality of network function instances included in the selected network slice instance. Here, the network slice instance may be in an instantiated form of a network slice that includes at least one network function and resource for providing a network service having a predetermined capability and characteristic to the UE.

The description made above with reference to FIGS. 1 through 10 may be applicable to the respective components of FIG. 11 and a further description is omitted here.

Figure 12:
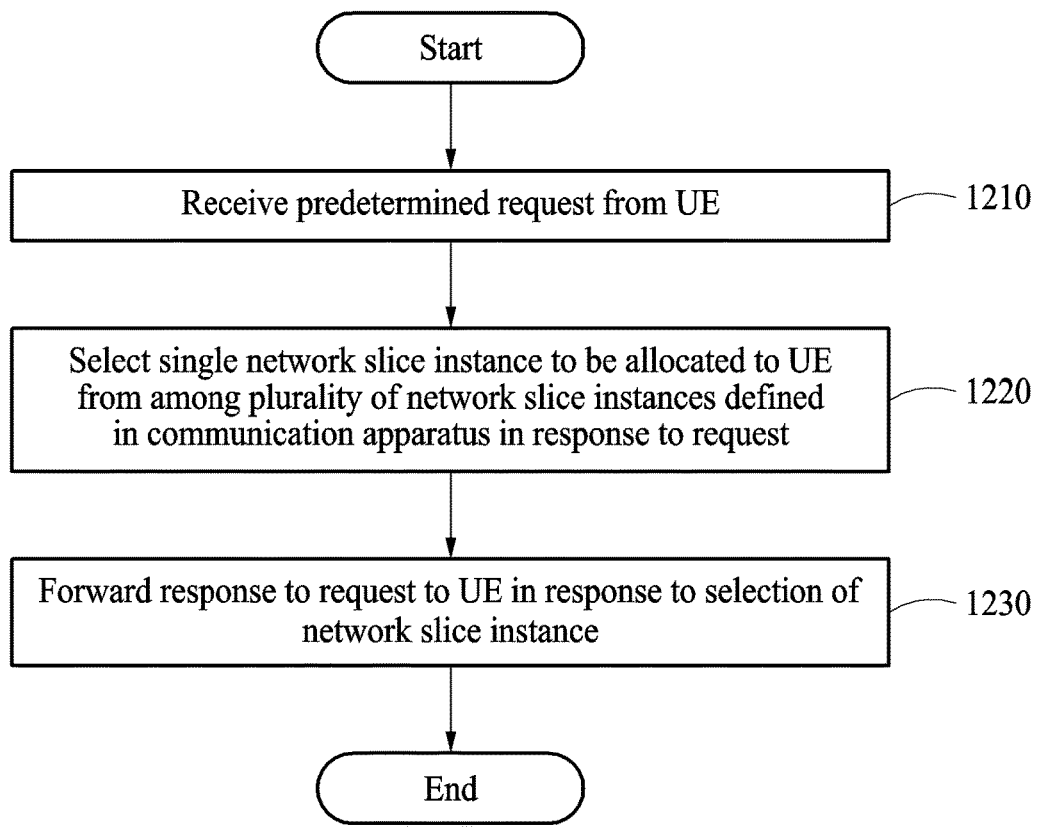
FIGS. 12 and 13 are flowcharts illustrating a communication method according to an example embodiment.
Figure 13:
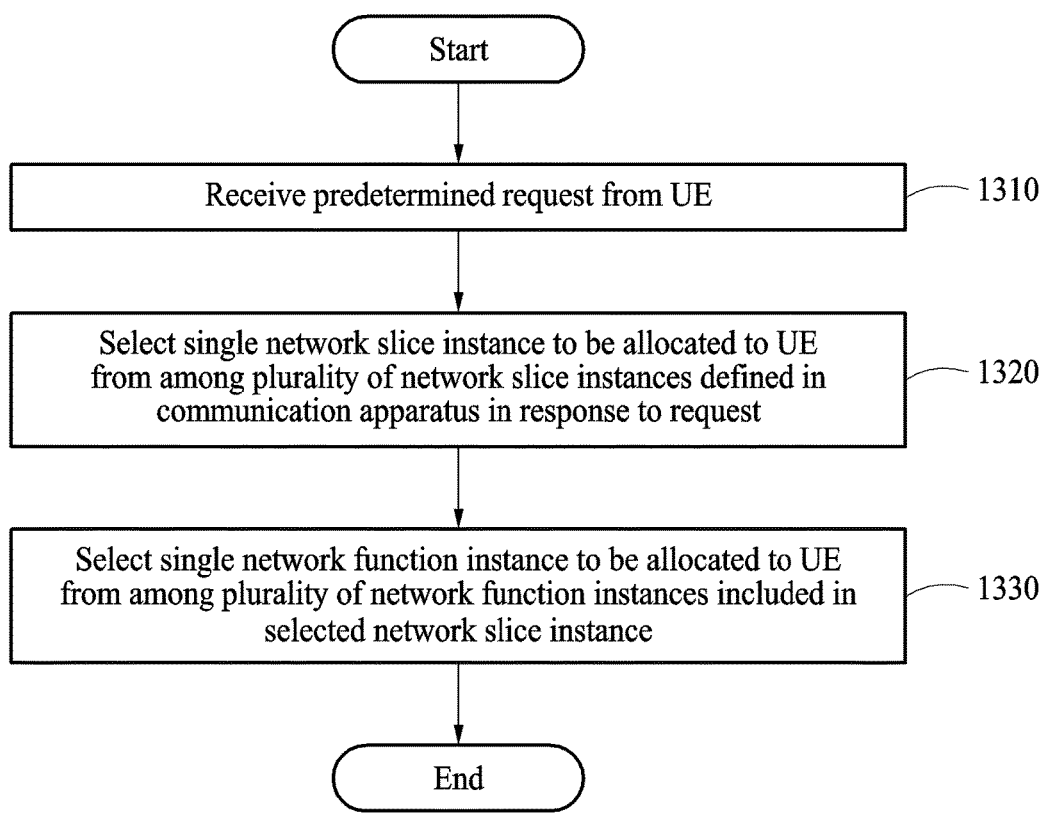

FIGS. 12 and 13 are flowcharts illustrating a communication method according to an example embodiment.

A communication method of a communication apparatus that performs communication with a UE in a UE registration according to an example embodiment will be described with reference to FIG. 12.

Referring to FIG. 12, in operation 1210, the communication apparatus receives a predetermined request from the UE. NSSAI may be included in the request. For example, the request may be a registration request.

In operation 1220, the communication apparatus selects a network slice instance to be allocated to the UE from among the plurality of network slice instances in the communication apparatus in response to the request. The communication apparatus may select the network slice instance to be allocated to the UE based on the NSSAI included in the request.

The NSSAI may include (a) an SST requested from the UE or (b) the SST and an SD corresponding to the UE. The SST may indicate an expected network behavior in terms of a service requested from the UE. The SD may complement the SST to select a single network slice instance from among a plurality of network slice instances that comply with the SST in response to the plurality of network slice instances complying with the SST. The SD may include at least one of an area in which the UE is located, subscription data of the UE, QoS attributes of the plurality of network slice instances, and terminal characteristics.

The communication apparatus may select the network slice instance to be allocated to the UE by further using at least one of the network slice instance pre-allocated to the UE and a serving registration area of the UE.

In operation 1230, the communication apparatus forwards a response to the request to the UE in response to the selection of the network slice instance. For example, the response to the request may be a registration accept message.

Also, in response to a detection of a new AMF further appropriate compared to a current AMF to provide the selected network slice instance to the UE, the communication apparatus may perform relocation from the AMF to the new AMF. When the plurality of network slice instances is allocated to the UE, an AMF and an NSSF included in the communication apparatus may be shared between the plurality of network slice instances allocated to the UE.

FIG. 13 illustrates a communication method of a communication apparatus that performs communication with a UE in a PDU session establishment according to an example embodiment.

Referring to FIG. 13, in operation 1310, the communication apparatus receives a predetermined request from the UE.

In operation 1320, the communication apparatus selects a network slice instance to be allocated to the UE from among a plurality of network slice instances in the communication apparatus in response to the request. For example, the request may be a protocol data unit (PDU) session establishment request.

The communication apparatus may select the network slice instance to be allocated to the UE based on NSSAI that is included in the request.

The NSSAI may include (a) an SST requested from the UE or (b) the SST and an SD corresponding to the UE. The SST may indicate an expected network behavior in terms of a service requested from the UE. The SD may complement the SST to select a single network slice instance from among a plurality of network slice instances that comply with the SST in response to the plurality of network slice instances complying with the SST. The SD may include at least one of an area in which the UE is located, subscription data of the UE, QoS attributes of the plurality of network slice instances, and terminal characteristics.

The communication apparatus may select the network slice instance to be allocated to the UE by further using at least one of the network slice instance pre-allocated to the UE and a serving registration area of the UE.

In operation 1330, the communication apparatus selects a network function instance to be allocated to the UE from among a plurality of network function instances included in the selected network slice instance. The communication apparatus may select the network function instance to be allocated to the UE based on a logical network identifier indicating the selected network slice instance and a type of a network function indicating a role of the corresponding network function instance. The communication apparatus may select a single network function instance per type of a network function from among the plurality of network function instances included in the selected network slice instance. The communication apparatus may select the network function instance to be allocated to the UE by further considering a policy of the network operator that provides the network slice instance.

Also, the communication apparatus may select the network function instance based on a selection condition received by a serving NRF corresponding to the selected network slice instance from a source-network function instance that requests the selection of the network function instance. That is, the NRF-driven NFI selection may be performed.

Also, the communication apparatus enables the source-network function instance receiving a selectable NFI list from the serving NRF corresponding to the selected network slice instance to select the network function instance and to forward information about the selected network function instance to the serving NRF. That is, the NF-driven NFI selection may be performed. In detail, the source-network function instance may request an NRF for a list of destination-network function instances (D-NFIs). In response to the request, the NRF may return IP addresses of D-NFIs within a corresponding network slice instance. The source-network function instance may select a single D-NFI from the list received from the NRF and may manage a state.

The network slice instance may be in an instantiated form of a network slice that includes at least one network function and resource for providing a network slice having a predetermined capability and characteristic to the UE.

The description made above with reference to FIGS. 1 through 11 may be applicable to the respective operations of FIGS. 12 and 13, and a further description is omitted.

According to an aspect of at least one example embodiment, terms and definitions which is used in specification may be given as below:

5G Access Network: An access network comprising a 5G-RAN and/or non-3GPP AN connecting to a 5G Core Network.

5G Core Network: The core network specified in the present document. It connects to a 5G Access Network.

5G QoS Flow: The finest granularity for QoS forwarding treatment in the 5G System. All traffic mapped to the same 5G QoS Flow receive the same forwarding treatment (e.g. scheduling policy, queue management policy, rate shaping policy, RLC configuration, etc.). Providing different QoS forwarding treatment requires separate 5G QoS Flow.

5G QoS Indicator (5QI): A scalar that is used as a reference to a specific QoS forwarding behaviour (e.g. packet loss rate, packet delay budget) to be provided to a 5G QoS Flow. This may be implemented in the access network by the 5QI referencing node specific parameters that control the QoS forwarding treatment (e.g. scheduling weights, admission thresholds, queue management thresholds, link layer protocol configuration, etc.).

5G-RAN: A radio access network that supports one or more of the following options with the common characteristics that it connects to 5GC:
1) Standalone New Radio.
2) New Radio is the anchor with E-UTRA extensions.
3) Standalone E-UTRA.
4) E-UTRA is the anchor with New Radio extensions.

5G System: 3GPP system consisting of 5G Access Network (AN), 5G Core Network and UE.

Allowed NSSAI: an NSSAI provided by the serving PLMN during e.g. a registration procedure, indicating the NSSAI allowed by the network for the UE in the serving PLMN for the current registration area.

Allowed area: Area where the UE is allowed to initiate communication.

Configured NSSAI: an NSSAI that has been provisioned in the UE.

Forbidden area: An area where the UE is not allowed to initiate communication.

Initial Registration: UE registration in RM-DEREGISTERED state.

Mobility pattern: Network concept of determining within an NF the UE mobility parameters.

Mobility Registration update: UE re-registration when entering new TA outside the TAI List.

Network Function: A 3GPP adopted or 3GPP defined processing function in a network, which has defined functional behaviour and 3GPP defined interfaces.

Non-allowed area: Area where the UE is allowed to initiate registration procedure but no other communication.

PDU Connectivity Service: A service that provides exchange of PDUs between a UE and a Data Network.

PDU Session: Association between the UE and a Data Network that provides a PDU connectivity service. The type of association can be IP, Ethernet or unstructured.

Periodic Registration update: UE re-registration at expiry of periodic registration timer.

Requested NSSAI the NSSAI that the UE may provide to the network.

Service Continuity: The uninterrupted user experience of a service, including the cases where the IP address and/or anchoring point change.

Session Continuity: The continuity of a PDU session. For PDU session of IP type "session continuity" implies that the IP address is preserved for the lifetime of the PDU session.

Non-seamless Non-3GPP offload: The offload of user plane traffic via untrusted non-3GPP access without traversing either N3IWF or UPF.

Network Slicing
A Network Slice may include:
the Core Network control plane and user plane Network Functions
the N3IWF functions to the non-3GPP Access Network Network slices may differ for supported features and network functions optimisations. The operator may deploy multiple Network Slice instances delivering exactly the same features but for different groups of UEs, e.g. as they deliver a different committed service and/or because they may be dedicated to a customer.

A single UE can simultaneously be served by one or more Network Slice instances via a 5G-AN. The AMF instance serving the UE logically belongs to each of the Network Slice instances serving the UE, i.e. this AMF instance is common to the Network Slice instances serving a UE.

A PDU session belongs to one and only one specific Network Slice instance per PLMN. Different Network Slice instances do not share a PDU session, though different slices may have slice-specific PDU sessions using the same DNN.

Identification and Selection of a Network Slice: The S-NSSAI and the NSSAI

An S-NSSAI (Single Network Slice Selection Assistance information) identifies a Network Slice.

An S-NSSAI is comprised of:
A Slice/Service type (SST), which refers to the expected Network Slice behaviour in terms of features and services;
A Slice Differentiator (SD), which is optional information that complements the Slice/Service type(s) to allow further differentiation for selecting an Network Slice instance from the potentially multiple Network Slice instances that all comply with the indicated Slice/Service type. This information is referred to as SD.

The S-NSSAI can have standard values or PLMN-specific values. S-NSSAIs with PLMN-specific values are associated to the PLMN ID of PLMN that assigns it. An S-NSSAI shall not be used by the UE in access stratum procedures in any PLMN other than the one to which the S-NSSAI is associated.

The NSSAI is a collection of S-NSSAIs (Single Network Slice Selection Assistance Information). Each S-NSSAI assists the network in selecting a particular Network Slice Instance. The CN part of a Network Slice instance(s) serving a UE is selected by CN.

The (R)AN may use Requested NSSAI in access stratum signalling to handle the UE Control Plane connection before the 5GC informs the (R)AN of the Allowed NSSAI. The Requested NSSAI is not used by the RAN for routing when the UE provides also a Temporary User ID.

When a UE is successfully registered, the CN informs the (R)AN by providing the whole Allowed NSSAI for the Control Plane aspects.

When a PDU session for a specific slice instance is established, the CN provides to the (R)AN the S-NSSAI corresponding to the slice instance that this PDU session belongs to enable the RAN to perform access specific functions.

Subscription Aspects

Subscription data include the S-NSSAI(s) of the Network Slices that the UE subscribes to. One or more S-NSSAIs can be marked as default S-NSSAI. If an S-NSSAI is marked as default, then the network is expected to serve the UE with the related Network Slice even when the UE does not send any S-NSSAI to the network in a Registration request.

The NSSAI the UE provides in the Registration Request is verified against the user's subscription data.

UE NSSAI Configuration and NSSAI Storage Aspects

A UE can be configured by the HPLMN with a Configured NSSAI per PLMN. A Configured NSSAI can be PLMN-specific and the HPLMN indicates to what PLMN(s) each Configured NSSAI applies, including whether the Configured NSSAI applies to all PLMNs, i. e. the Configured NSSAI conveys the same information regardless of the PLMN the UE is accessing (e.g. this could be possible for NSSAIs containing only standardized S-NSSAIs). When providing a Requested NSSAI to the network upon registration, the UE in a given PLMN shall only use S-NSSAIs belonging to the Configured NSSAI, if any, of that PLMN.

Upon successful completion of a UE's Registration procedure, the UE may obtain from the AMF an Allowed NSSAI for this PLMN, which may include one or more S-NSSAIs. The Allowed NSSAI shall take precedence over the Configured NSSAI for this PLMN. The UE shall use only the S-NSSAIs in the Allowed NSSAI corresponding to a Network Slice for the subsequent nNtwork Slice selection related procedures in the serving PLMN, as described in section 5.15.5.

For each PLMN, the UE shall store the Configured NSSAI and, if any, the Allowed NSSAI. When the UE receives an Allowed NSSAI for a PLMN, it shall store it and override any previously stored Allowed NSSAI for this PLMN.

Detailed Operation Overview

The establishment of User Plane connectivity to a Data Network via a Network Slice instance(s) comprises two steps:
performing a RM procedure to select an AMF that supports the required Network Slices
establishing one or more PDU session to the required Data network via the Network Slice Instance(s)

Selection of a Serving AMF Supporting the Network Slices

Registration to a Set of Network Slices

UE with Configured or Allowed NSSAI for the PLMN

When a UE registers with a PLMN, if the UE for this PLMN has a Configured NSSAI or an Allowed NSSAI f, the UE shall provide to the network in RRC and NAS layer a Requested NSSAI containing the S-NSSAI(s) corresponding to the slice(s) to which the UE wishes to register, in addition to the Temporary User ID if one was assigned to the UE.

The Requested NSSAI may be either:
the Configured-NS SAI, or a subset thereof as described below, if the UE has no Allowed NSSAI for the current PLMN; or
the Allowed-NS SAI, or a subset thereof as described below, if the UE has an Allowed NSSAI for the current PLMN, or
the Allowed-NS SAT, or a subset thereof as described below, plus one or more S-NSSAIs from the Configured-NSSAI for which no corresponding S-NSSAI is present in the Allowed NSSAI and that were not previously permanently rejected (as defined below) by the network for the present tracking area.

The subset of Configured-NSSAI consists of a combination of S-NSSAIs including one or more S-NSSAI(s) in the Configured NSSAI applicable to this PLMN, if the S-NSSAI was not previously permanently rejected (as defined below) by the network for the present tracking area, or was not previously added by the UE in a Requested NSSAI.

The subset of Allowed NSSAI consists of a combination of S-NSSAIs including one or more S-NSSAI(s) in the last Allowed NSSAI for this PLMN.

The UE may provide in the Requested NSSAI an S-NSSAI from the Configured NSSAI that the UE previously provided to the serving PLMN in the current registration area.

The UE shall include the Requested NSSAI at RRC Connection Establishment and in NAS messages. The RAN shall route the NAS signaling between this UE and an AMF selected using the Requested NSSAI obtained during RRC Connection Establishment. If the RAN is unable to select an AMF based on the Requested NSSAI, it routes the NAS signalling to an AMF from a set of default AMFs.

Upon successful Registration, the UE is provided with a Temporary ID by the serving AMF. The UE shall include this Temporary ID in any RRC Connection Establishment during subsequent initial accesses to enable the RAN to route the NAS signalling between the UE and the appropriate AMF.

The serving PLMN may also return a new Allowed NSSAI identifying the Network Slices permitted by the serving PLMN for the UE. The UE shall store this new Allowed NSSAI and override any previously stored Allowed NSSAI for this PLMN.

The network may individually reject an S-NSSAI provided by the UE in the Requested NSSAI with a rejection cause. The network may also indicate if the rejection is permanent (e.g. the S-NSSAI is not supported by the PLMN in at least the current registration area) or temporary (e.g. the nNetwork sSlice corresponding to the S-NSSAI is temporarily unavailable).

When receiving from the UE a Requested NSSAI and a Temporary ID in RRC, if the RAN can reach an AMF corresponding to the Temporary ID, then RAN forwards the request to this AMF. Otherwise, the RAN selects a suitable AMF based on the Requested NSSAI provided by the UE and forwards the request to the selected AMF. If the RAN is not able to select an AMF based on the Requested NSSAI, then the request is sent to a default AMF.

UE Without any NSSAI for the PLMN

When a UE registers with a PLMN, if for this PLMN the UE has no Configured NSSAI or Allowed NSSAI, the RAN shall route all NAS signalling from/to this UE to/from a default AMF. The UE shall not indicate any NSSAI in RRC Connection Establishment or Initial NAS message unless it has a Configured NSSAI or Allowed NSSAI for the corresponding PLMN. Upon successful Registration, the UE is provided with a Temporary ID by an AMF in this PLMN as well as with an Allowed NSSAI identifying the slices permitted by the serving PLMN for the UE, which are part of the subscribed default S-NSSAI(s) of the UE. The UE shall include this Temporary ID in any RRC Connection Establishment during subsequent initial accesses to enable the RAN to route the NAS signalling between the UE and the appropriate AMF.

Modification of the Set of Network Slice(s) for a UE

The set of Network Slices for a UE can be changed at any time while the UE is registered with a network, and may be initiated by the network, or the UE under certain conditions as described below.

The network, based on local policies, subscription changes and/or UE mobility, may change the set of permitted Network Slice(s) to which the UE is registered. The network may perform such change during a Registration procedure or trigger a notification towards the UE of the change of the supported Network Slices using an RM procedure (which may trigger a Registration procedure). The Network provides the UE with a new Allowed NSSAI and Tracking Area list.

In order to change the set of S-NSSAIs being used, the UE shall initiate a Registration procedure.

Change of set of S-NSSAIs to which the UE is registered (whether UE or Network initiated) may lead to AMF change subject to operator policy.

AMF Relocation due to Network Slice(s) Support

During a Registration procedure in a PLMN, in case the network decides that the UE should be served by a different AMF based on Network Slice(s) aspects, then the AMF that first received the Registration Request shall redirect the Registration request to another AMF via the RAN or via direct signalling between the initial AMF and the target AMF. The redirection message sent by the AMF via the RAN shall include information for selection of a new AMF to serve the UE.

For a UE that is already registered, the system shall support a redirection initiated by the network of a UE from its serving AMF to a target AMF due to Network Slice(s) considerations. Operator policy determines whether redirection between AMFs is allowed.

Establishing Connectivity PDU Session to the Required Network Slice Instance(s)

The establishment of a PDU session in a Network Slice to a DN allows data transmission in a Network Slice. A Data Network is associated to an S-NSSAI and a DNN.

The network operator may provision the UE with Network Slice selection policy (NSSP). The NSSP includes one or more NSSP rules each one associating an application with a certain S-NSSAI. A default rule which matches all applications to a S-NSSAI may also be included. When a UE application associated with a specific S-NSSAI requests data transmission, then:

If the UE has one or more PDU sessions established corresponding to the specific S-NS SAT, the UE routes the user data of this application in one of these PDU sessions, unless other conditions in the UE prohibit the use of these PDU sessions. If the application provides a DNN, then the UE considers also this DNN to determine which PDU session to use. If the UE does not have a PDU session established with this specific S-NSSAI, the UE requests a new PDU session corresponding to this S-NSSAI and with the DNN that may be provided by the application. In order for the RAN to select a proper resource for supporting network slicing in the RAN, RAN needs to be aware of the Network Slices used by the UE.

The AMF selects an SMF in a Network Slice instance based on S-NS SAT, DNN and other information e.g. UE subscription and local operator policies, when the UE triggers the establishment of a PDU session. The selected SMF establishes a PDU session based on S-NSSAI and DNN.

NRF

The NF Repository Function (NRF) supports the following functionality:

Supports service discovery function. Receive NF Discovery Request from NF instance, and provides the information of the discovered NF instances (be discovered) to the NF instance.

Network Function Discovery and Selection

The NF discovery enables one NF discover a specific target NF type.

Unless the expected NF information is locally configured on requester NF, e.g. the expected NF is in the same PLMN the NF discovery is implemented via the NRF. The NF repository function (NRF) is the logical function that is used to supports the functionality of NF discovery.

In order to access to a requested type NF and no associated NF(s) stored on the requester NF, the requester NF initiates the NF discovery by providing the type of the NF (e.g. SMF, PCF) and other service parameters e.g. slicing related information to discover the target NF.

The NRF provides the IP address or the FQDN of NF instance(s) to the requester NF for target NF instance selection. Based on that information, the requester NF can select one NF instance.

For NF discovery across PLMNs, the requester NF provides the NRF the PLMN ID of the target NF. The Local PLMN interacts with the NRF in the target PLMN to retrieve the IP address or the FQDN of the target NF instance (s).

NRF Services

"NF Discovery" Service

Service description: provides the IP address or FQDN of the expected NF instance(s) to the requester NF.

Input: NF type of the target NF, NF type of the requester NF, PLMN ID of the PLMN target NF belongs to, service related information.

Output: a set of target NF instance(s).

Figure 14:
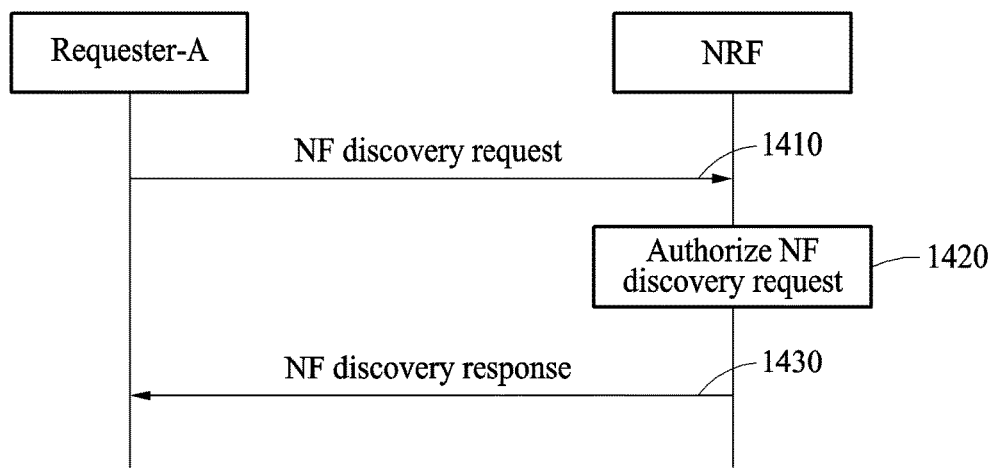
FIG. 14 is a flowchart illustrating NF Discovery service according to an example embodiment.

Service procedure is shown on FIG. 14.

In operation 1410, the Requester-A NF needs to discover the expected NF instance(s). For example, the AMF requests to discover the SMF instance(s) in the same PLMN. The Requester-A sends NF Discovery Request to NRF in the same PLMN, including: NF Type of the expected NF instance, NF type of the requester, Network Slice related information (optional), and other service related parameters.

In operation 1420, the NRF authorizes the NF Discovery Request. Based on the profile of the expected NF and the type of the requester NF, the NRF determines whether the requester NF is allowed to discover the expected NF instance(s). If the expected NF instance(s) are deployed in one network slice, NRF authorizes the discovery request according to the discovery configuration of the Network Slice, e.g. the expected NF instance(s) are only discoverable by the NF in the same network slice.

In operation 1430, if allowed, the NRF determines the discovered NF instance(s) and provides the information of a set of discovered NF instance(s) to the Requester via NF Discovery Response message. The information of the discovered NF instance(s) include: FQDN or IP address of the expected NF instance(s).

Figure 15:
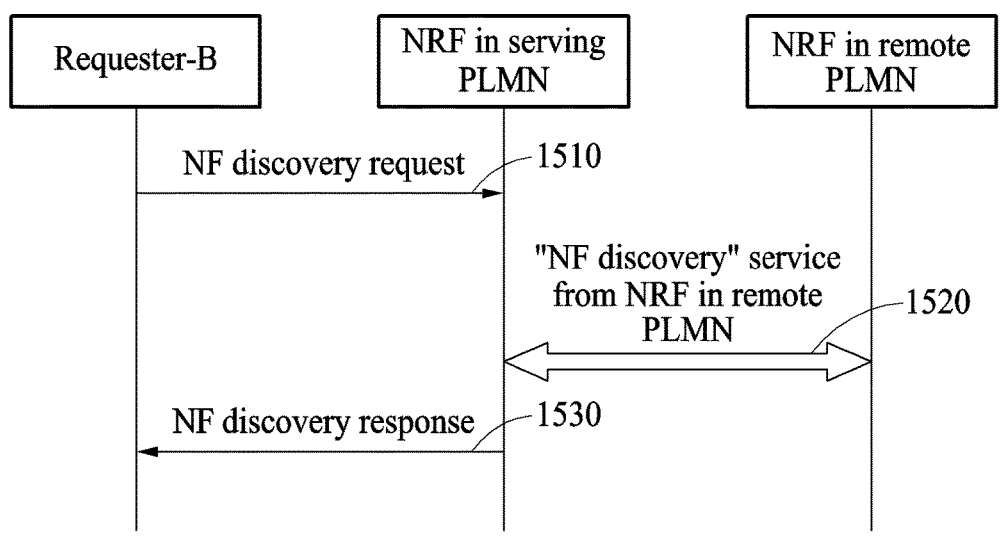
FIG. 15 is a flowchart illustrating NF Discovery service across PLMNs according to an example embodiment.

In case that the requester needs to discover the NF in another PLMN, the NRF in serving PLMN needs to requests "NF Discovery" service from NRF in the remote PLMN. The procedure is depicted in FIG. 15.

In operation 1510, the Requester-B NF needs to discover the NF instance(s) in remote PLMN. For example, the AMF requests to discover the SMF instance(s) in the remote PLMN. The requester sends NF Discovery Request to NRF, including: NF type of the expected NF, the Remote PLMN ID are included in the NF Discovery Request.

In operation 1520, the NRF in serving PLMN identifies NRF in remote PLMN based on the Remote PLMN ID, and it requests "NF Discovery" service from NRF in remote PLMN according the procedure in FIG. 5.2.7.1-1 to get the expected NF instance (s) deployed in the remote PLMN. As the NRF in the serving PLMN triggers the "NF Discovery" on behalf of the Requester-B NF, the NRF in the serving PLMN shall not replace the information of the service requester NF, i.e. Requester-B NF, in the Discovery Request message it sends to the NRF in remote PLMN.

In operation 1530, the NRF in serving PLMN provides the information of a set of the discovered NF Instance(s) in NF Discovery Response message.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method, the method comprising:
   identifying a S-NSSAI (single network slice selection assistance information) of a network slice for a network; and
   selecting the network slice using the S-NSSAI,
   wherein the network slice is logical network which provides a network capability and a network characteristic,
   wherein the S-NSSAI includes a slice/service type (SST), which refers an expected behavior of the network slice in terms of a feature and a service and wherein the S-NSSAI includes a slice differentiator (SD) which complements a slice/service type.

2. The method of claim 1, wherein the network slice is different from features and network functions optimization.

3. The method of claim 1, wherein the network slice includes core network control plane and user plane network function.

4. The method of claim 1, wherein a single user equipment is served with one or more network slice instances via an access network,
   wherein the network slice instance is network function instance and a resource for the network slice.

5. The method of claim 4, wherein a PDU(protocol data unit) session belongs to one network slice instance per PLMN(public land mobile network).

6. The method of claim 1, wherein the S-NSSAI is included in subscription information, and is marked as default.

7. A communication method, the method comprising:
   providing a requested NSSAI(network slice selection assistance information) including at least one of S-NSSAI corresponding to a network slices which a user equipment wishes to register;
   registering the user equipment with a PLMN(public land mobile network),
   wherein the network slice is logical network which provides a network capability and a network characteristic,
   wherein the S-NSSAI includes a slice/service type (SST), which refers an expected behavior of the network slice in terms of a feature and a service and wherein the S-NSSAI includes a slice differentiator (SD) which complements a slice/service type.

8. The method of claim 7, wherein the requested NSSAI includes (i) a configured-NSSAI, and (ii) an allowed-NSSAI.

9. The method of claim 7, wherein the network slice is changed at any time while the user equipment is registered with the PLMN.

10. A communication device, the communication device comprising:
    one or more processor is configured to:
    identify a S-NSSAI (single network slice selection assistance information) of a network slice for a network; and
    select the network slice using the S-NSSAI,
    wherein the network slice is logical network which provides a network capability and a network characteristic,
    wherein the S-NSSAI includes a slice/service type (SST), which refers an expected behavior of the network slice in terms of a feature and a service and wherein the S-NSSAI includes a slice differentiator (SD) which complements a slice/service type.

11. The communication device of claim 10, wherein the network slice is different from features and network functions optimization.

12. The communication device of claim 10, wherein the network slice includes core network control plane and user plane network function.

13. The communication device of claim 10, wherein a single user equipment is served with one or more network slice instances via an access network,
    wherein the network slice instance is network function instance and a resource for the network slice.

14. The communication device of claim 13, wherein a PDU(protocol data unit) session belongs to one network slice instance per PLMN(public land mobile network).

15. The communication device of claim 1, wherein the S-NSSAI is included in subscription information, and is marked as default.

* * * * *